United States Patent [19]

Kaneda et al.

[11] Patent Number: 5,554,916
[45] Date of Patent: Sep. 10, 1996

[54] METHOD OF STARTING A SENSORLESS MOTOR

[75] Inventors: Isao Kaneda, Moriyama; Kohei Yonemura, Yokaichi, both of Japan

[73] Assignee: Nidec Corporation, Kyoto, Japan

[21] Appl. No.: 160,026

[22] Filed: Nov. 30, 1993

[30] Foreign Application Priority Data

| Nov. 30, 1992 | [JP] | Japan | 4-319929 |
| Dec. 1, 1992 | [JP] | Japan | 4-321861 |
| Dec. 7, 1992 | [JP] | Japan | 4-326382 |
| Dec. 17, 1992 | [JP] | Japan | 4-337064 |

[51] Int. Cl.$^6$ ............................................ G05B 11/14
[52] U.S. Cl. ........................... 318/672; 318/685; 318/603
[58] Field of Search .................................. 318/696, 685, 318/254, 138, 430, 439, 727, 672, 683, 684, 603; 388/811

[56] References Cited

U.S. PATENT DOCUMENTS

| 4,259,698 | 3/1981 | Takada | 388/811 |
| 4,631,657 | 12/1986 | Hill et al. | 318/696 |
| 4,876,491 | 10/1989 | Squires et al. | |
| 4,928,043 | 5/1990 | Plunkett. | |
| 5,019,756 | 5/1991 | Schwarz. | |
| 5,235,264 | 8/1993 | Kaneda et al. | 318/727 |
| 5,396,159 | 3/1995 | Kaneda | 318/431 |

*Primary Examiner*—John W. Cabeca
*Attorney, Agent, or Firm*—McCormick, Paulding & Huber

[57] ABSTRACT

A method of starting a sensorless motor comprising a stator provided with three-phase stator coils to which an exciting current is supplied, and a rotor provided with a rotor magnet for obtaining a rotating torque by the electromagnetic interaction of the stator wherein a first stepping step and a second stepping step for starting the rotor at the time of starting the motor are carried out. In the early period of the second stepping step, a reverse exciting operation is carried out in which an exciting current is switched off from positive to negative or from negative to positive without including a cessation period in two-phase coils out of the three-phase stator coils.

16 Claims, 22 Drawing Sheets

Fig. 18

| ① | ② | ③ | ④ | ⑤ | ⑥ | ① | ② | ③ | ④ | ⑤ | ⑥ |
|---|---|---|---|---|---|---|---|---|---|---|---|
| u ↓ v | w ↓ v | w ↓ u | v ↓ u | v ↓ w | u ↓ w | u ↓ v | w ↓ v | w ↓ u | v ↓ u | v ↓ w | u ↓ w |

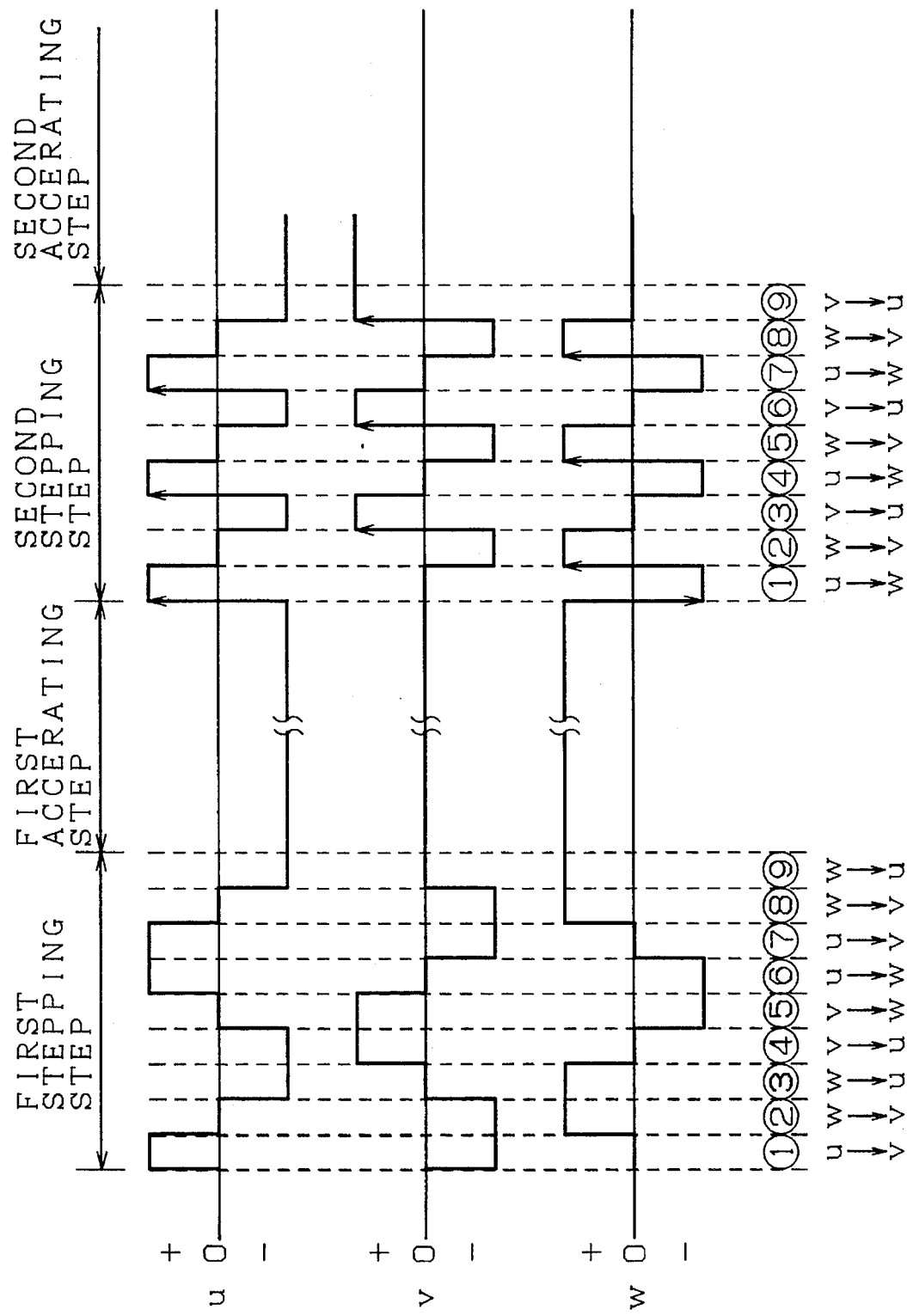

METHOD OF STARTING A SENSORLESS MOTOR

FIELD OF THE INVENTION

This invention relates to a method of starting a sensorless motor, especially to a technique of increasing the reliability of its starting.

BACKGROUND OF THE INVENTION

Heretofore, a brushless DC motor has been used as a motor for rotating and driving a magnetic disk device. The motor of this type has been called a spindle motor. A well-known one has a structure having a stator provided with stator coils to which an exciting current is supplied, a rotor provided with a rotor magnet for obtaining a rotating power by the electromagnetic interaction with the stator coils, and a position detecting sensor for detecting the rotating position of the rotor magnet. In motors of this type, the rotating angular position of the rotor magnet is detected by the position detecting sensor, and based on the detected signal from the position detecting sensor, the exciting current to be supplied to the stator coil is switched off. A hall element is used as the position detecting sensor.

In recent years, however, to construct the motor in small-sizes or avoid the deterioration of characteristics of the sensor, a so-called sensorless DC motor which detects the position of a rotor magnet by utilizing induced voltage generated in a coil through which an exciting current does not flow without using a position detecting sensor has been generalized.

Since in the sensorless motor, a back electromotive force cannot be obtained when the motor stops, the rotor is swivelled at the time of starting. For example, in a three-phase coil spindle motor, a stepping step of successively supplying an exciting current to the stator coil is repeated. In this stepping step, an exciting current usually in a positive direction, a cessation period, or a reverse direction is supplied to each phase.

However, in such a sensorless DC motor, the technical problems to be described below exist in the method of its starting. In the above sensorless DC motor, the position of the rotor magnet is detected by the induced voltage, but since there is no induced voltage at the time of stoppage of the motor, and furthermore, the polarity of the magnet is unknown, a signal of a predetermined pattern is formed forcibly, and the motor is started. However, depending upon the position of the rotor, poor starting occurs because of a low torque. Or a magnetic field is developed in a reverse direction, and at the time of rising during starting, the rotor may rotate in a reverse direction.

In order to avoid such inconveniences and increase starting reliability, the present applicant proposed a method of starting a novel sensorless motor, as disclosed in U.S. Pat. No. 5,235,264. This starting method includes a reverse exciting operation of reversing the current flowing direction from positive to negative or from negative to positive without including a cessation time at the time of starting the sensorless motor. When this reverse exciting operation is carried out, a large flux density changing width occurs and the dead point of starting is dissolved, and simultaneously, a high torque is developed, and starting reliability increases.

In this improved starting method, usually after a first stepping step of supplying an exciting current to a stator coil with a predetermined inner stepping pattern, an exciting current is supplied with the same inner stepping step as above in a second stepping step, and in the early period of the second stepping step, a reverse exciting operation is obtained. Accordingly, when the motor is not at all started in the first stepping step, a reverse exciting operation is carried out in the early period of the second stepping step, and the probability of starting the motor becomes very great.

However, in such a method of starting, it is only the case of a one-phase coil that a reverse exciting operation is carried out in the early period of the second stepping step. Accordingly, it is impossible to obtain a very sufficient starting torque, and the method is still required to be improved.

SUMMARY OF THE INVENTION

An object of the invention is to provide a method of starting a sensorless motor wherein a sufficient torque can be obtained at the time of starting.

Another object of the invention is to provide a method of starting a sensorless motor wherein a sufficient torque can be obtained in a relatively long period in the starting of the motor.

Still other object of the invention is to provide a method of starting a sensorless motor wherein a reverse exciting operation can be obtained with a relatively simple controlling.

Other objects and characteristics of the invention will be very easily understood from the following description.

BRIEF DESCRIPTION OF THE DRAWINGS

FIG. 18 is an explanatory view showing one example of a stepping pattern signal produced in the control system of FIG. 17;

FIG. 22 is a time chart showing an inner stepping pattern signal in the stepping step practised in accordance with the control system of a modified example.

DETAILED DESCRIPTION OF THE PREFERRED EMBODIMENTS

The invention will be further described in detail with reference to the accompanying drawings.

First Specific Example

Figure 1:
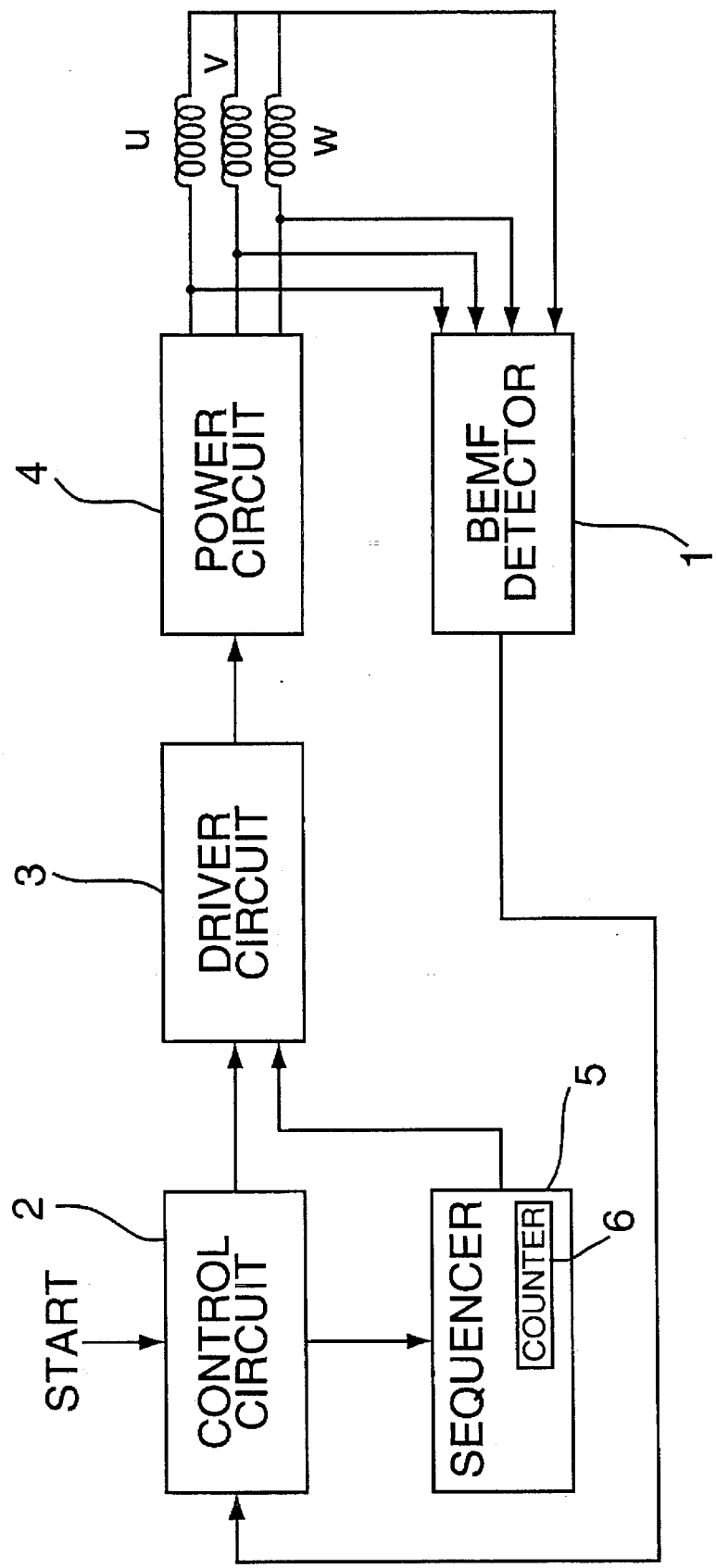
FIG. 1 is a block diagram showing a control system of a DC motor to which a first embodiment of the method of starting a sensorless motor of this invention is applied.

FIG. 1 to FIG. 4 show a first specific example of the method of starting a sensorless motor in accordance with the invention. In this specific example, the starting method of this invention is applied to a three-phase sensorless DC motor, and FIG. 1 shows a control system of the motor.

In FIG. 1, the depicted DC motor has a stator and a rotor rotatable relative to the stator. The stator has a stator core (not shown) constructed by laminating a plurality of core plates, and stator coils u, v, and w are wound on the stator core. Since three coils u, v, and w are wound on the stator core, this motor is a three-phase motor. In the three-phase motor, an exciting current is usually supplied to two phases, and a back electromotive force is detected in the remaining coil through which an exciting current is not supplied.

The control system of this motor has a back electromotive force detecting circuit 1 for detecting a back electomotive force induced in each of the stator coils u, v, and w, a control circuit 2 (acting as a control means) into which a detecting signal of the back electromotive force circuit 1 is inputted, a driver circuit 3 (acting as a driver means) connected to the output side of the control circuit 2, a power circuit 4 and a sequencer 5 which receives a control signal from the control circuit 2 and outputs an inner stepping pattern signal predetermined at the time of starting to the driver circuit 3.

Figure 2:
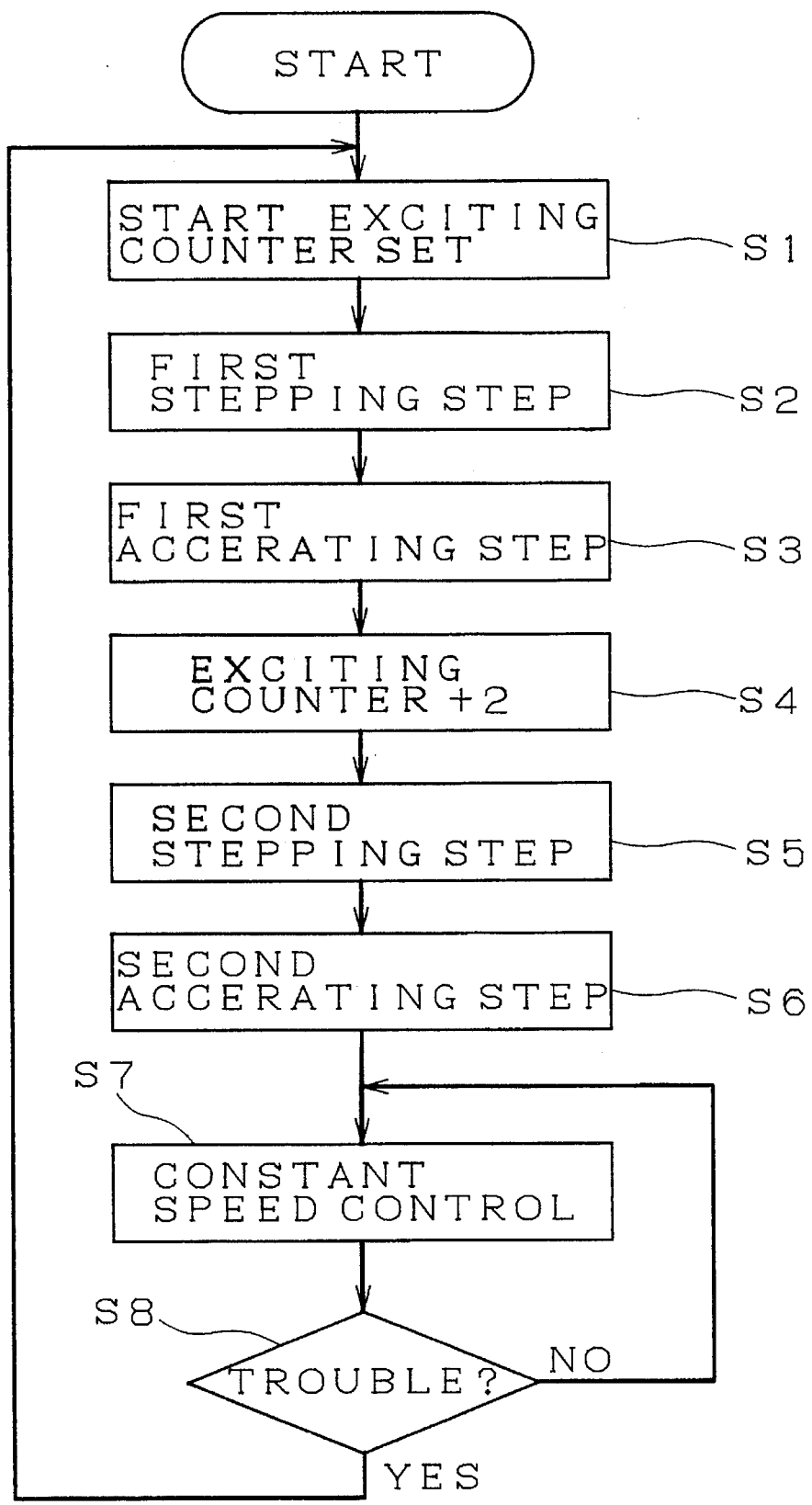
FIG. 2 is a flow chart showing the control of the motor by the control system of FIG. 1.
Figure 3:
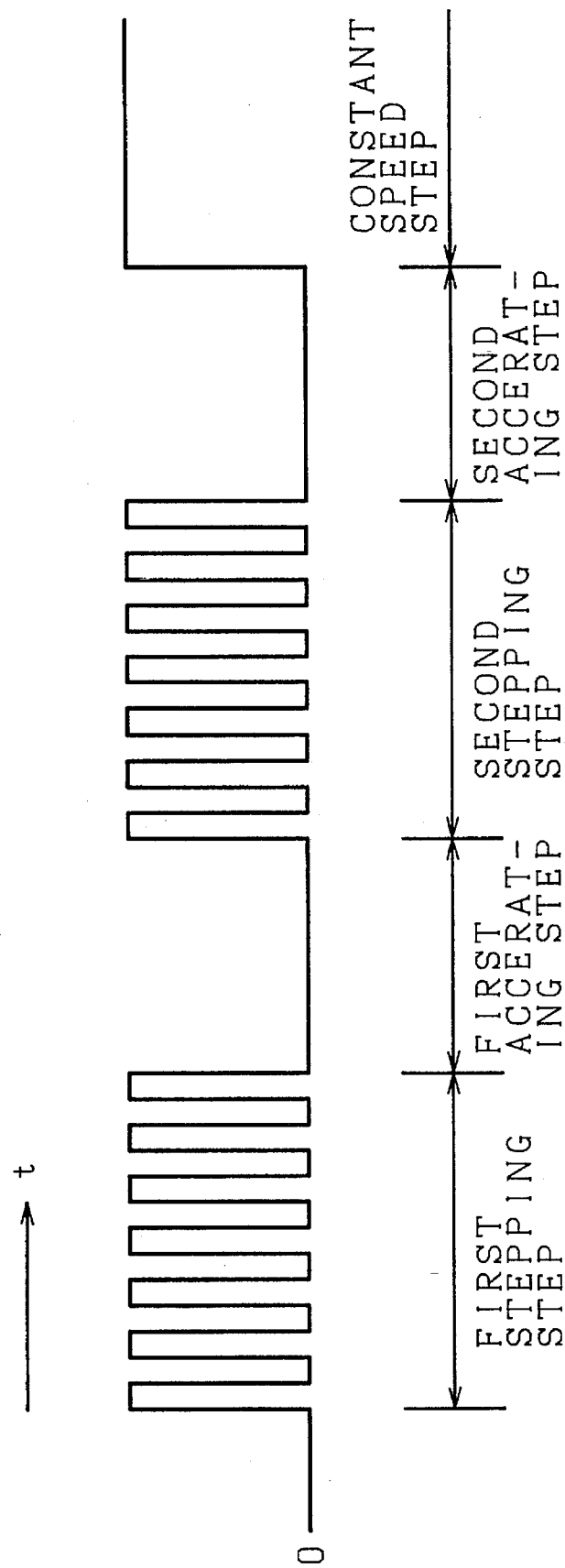
FIG. 3 is a time chart of a stepping step to be carried out in accordance with the flow chart of FIG. 2.

The power circuit 4 receives an output signal from the driver circuit 3 which operates on the basis of the instructions from the control circuit 2 and supplies an exciting current with a predetermined pattern in each of the stator coils u, v, and w. The control circuit 2 controls the starting of the motor and a steady operation after the starting on the basis of the signal from the back electromotive force detecting circuit 1. FIG. 2 shows a control flow at the time of starting practised in the control circuit 2. FIG. 3 shows a time chart of a stepping step at the time of starting.

In the stepping step, the first and second stepping steps and first and second accelerating steps are prescribed, and the stepping step is repeated twice. In each stepping step, an inner stepping pattern signal in which 9 inner stepping steps are carried out is produced in the sequencer 5. Furthermore, in this specific example, the inner stepping pattern signal of the first stepping step is a period synchronizing with the inertia of the motor, and first to ninth 9 inner steps (1) to (9) are preset so that the exciting current is supplied to the stator coils u, v and w in the sequence of u→v, u→w, v→w, v→u, w→u, and w→v.

In the flow chart shown in FIG. 2, when the control circuit 2 is actuated by receiving a start signal, a start exciting counter 6 is set in step s1, and in step s2, a first stepping step is carried out. This exciting counter 6 is included in the sequence 5 (see FIG. 1). In the first stepping step performed in step s2, the sequencer 5 is actuated on the basis of the control signal of the control circuit 2. Its output signal is inputted into the driver circuit 3, and via the power circuit 4, in the first inner stepping step (1), an exciting current is supplied for a predetermined period of time form the stator coil u to the stator coil v. In the next second stepping step (2), an exciting current is supplied from the stator coil u to the stator coil w. Thereafter, according to the inner stepping pattern signal shown in FIG. 4, an exciting current is supplied successively to the stator coils u, v and w.

When the first stepping step including nine inner stepping steps (1) to (9) is performed, the first accelerating step is carried out for a predetermined time in step s3. At this time, the mutual positions of the rotor magnet and the stator coils u, v and w are detected by the detecting signal of the back electromotive force detecting circuit 1 connected to each of the stator coil u, v and w. According to the detecting positions, the exciting pattern signal is changed, and the rotation of the rotor is controlled.

Figure 4:
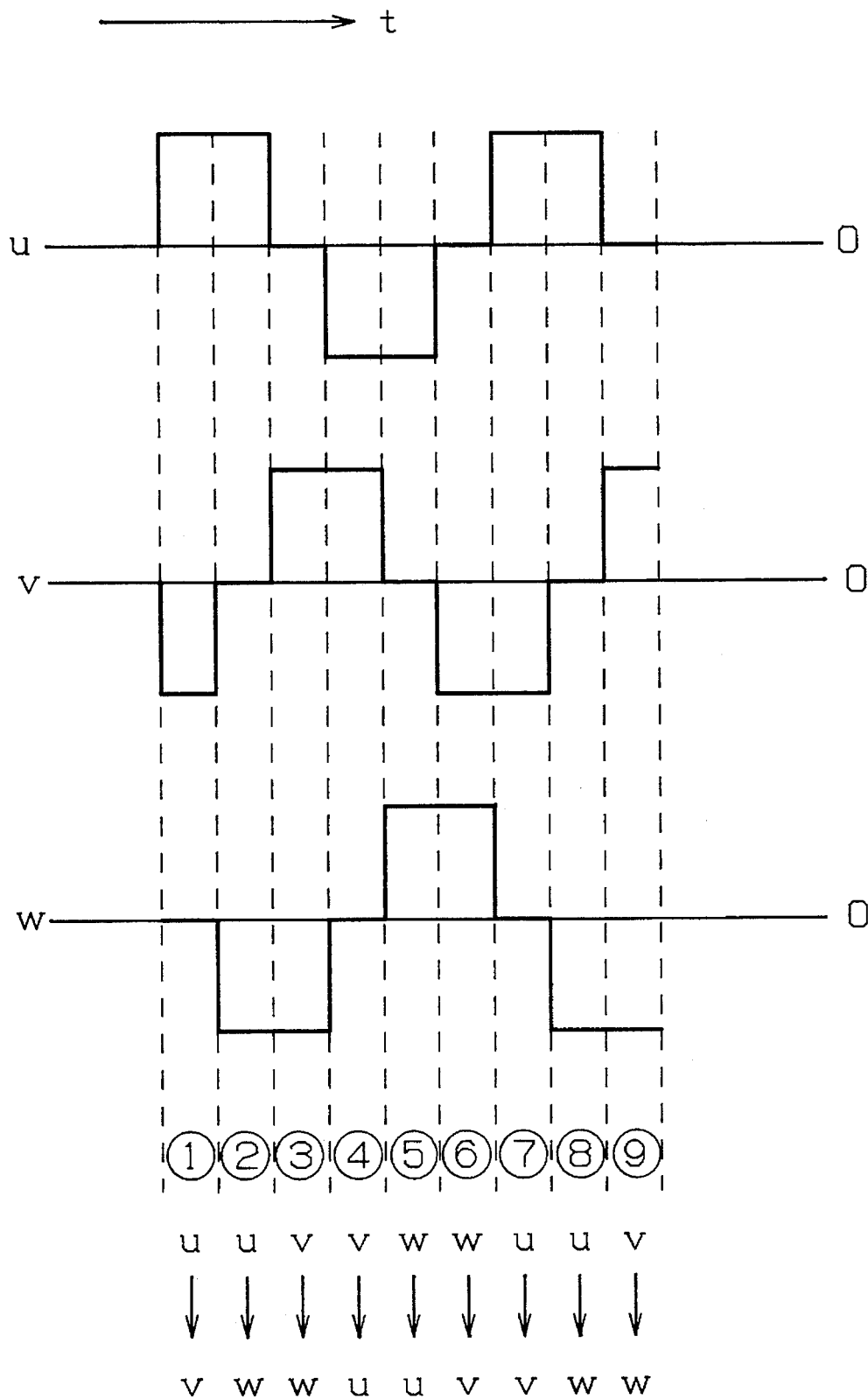
FIG. 4 is a time chart showing a first inner stepping pattern signal in a first stepping step practised in accordance with the flow chart of FIG. 2.

In the subsequent step s4, 2 is added to the counted value of the exciting counter 6 showing the final exciting pattern of the first accelerating step, and the second stepping step is performed in step s5. Usually (in the first stepping step of the specific example) the exciting counter 6 is calculated while the counted value 1 is added. For example, if the motor is not at all started in the first stepping step carried out in step s2, the final step of its inner stepping is a ninth inner stepping step (9) as shown in FIG. 4. In this step, an exciting current is supplied to the stator coil v–W.

When with respect to the final inner stepping step (9), 2 is added to the exciting counter 6 in step s5, the first inner stepping step of the second stepping step is in a state in which, as practised heretofore, an exciting current is not supplied to the stator coil v→u, and an inner stepping step is carried out in a condition skipped by 1 in a forward direction from w→u. Such an inner stepping pattern signal in the second stepping step is shown in FIG. 5.

Figure 5:
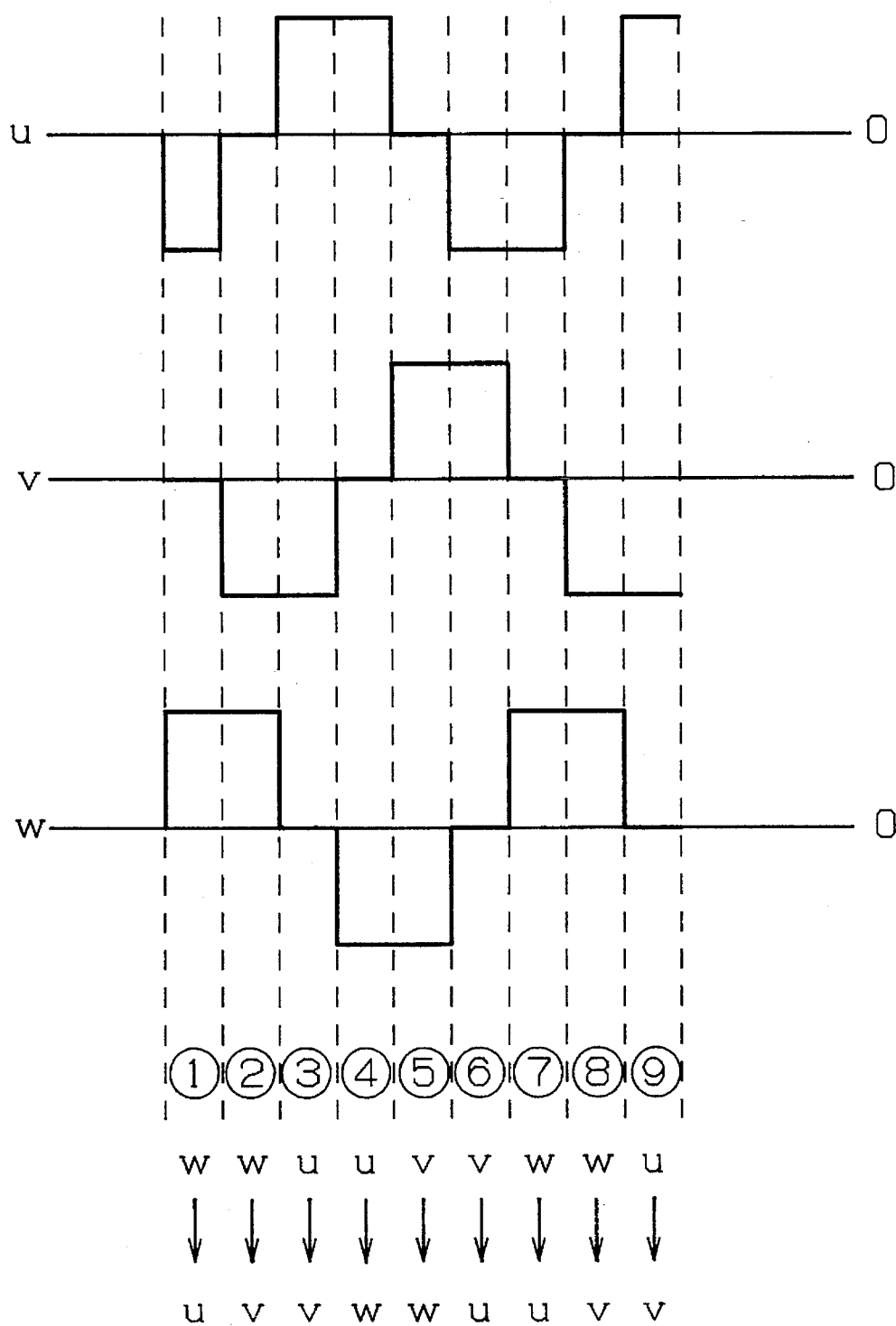
FIG. 5 is a time chart showing a second inner stepping pattern signal in a second stepping step practised in accordance with the flow chart of FIG. 2.

When the second stepping step is carried out in this manner, in its early period, as can be understood from FIGS. 4 and 5, a reverse exciting operation in which the exciting current is reversed from negative to positive is carried out without including the cessation time with respect to the stator coil w. Such a reverse exciting operation is obtained when the motor does not at all start, and also the starting of the motor is insufficient.

The motor is somewhat started, but its torque is insufficient. The first stepping step results only in oscillation. In the first acceleration step, the relative positional relation between the rotor magnet and the stator coils u, v and w is sought in the back electromotive force detecting circuit 1. For example, just before the performance of the second stepping step, an inner stepping step (7) is carried out. In the second stepping step, 2 is added to a counted value corresponding to the inner stepping step (7); namely, an inner stepping from step (9) is carried out. This results in the performance of a reverse exciting driving operation in which the exciting current is reversed from negative to positive without including a cessation time in the stator coil v.

To obtain such a reverse exciting operation, not only 2 is added to the exciting counter 6 but 2 is subtracted from the counted value of exciting counter 6 and from the final inner stepping step of the first stepping step, skipping is carried out by 1 rearwardly. As a result, in the early period of the second stepping step, the same reverse exciting operation as above is performed. When the second stepping step is performed in step s5, a second acceleration step is carried out in step s6. Thereafter, a constant speed step is performed in step s7.

When the constant speed step is carried out, and its condition does not show any trouble, this condition is maintained. On the other hand, when a trouble occurs in the constant speed step and detected in step s8, step s1 is returned and the treatment at the time of starting is performed again.

According to the aforesaid method of starting a DC motor, if starting in the first stepping step fails, a relatively simple controlling of skipping the inner stepping step by 1 forwardly or rearwardly enables a reverse exciting operation to be accurately performed in an early period of the second stepping step. Accordingly, a great magnetic flux density variation width is developed and the dead point of starting is dissolved. At the same time, a high torque is developed and the starting of the motor is accurately performed.

Second Specific Example

Figure 6:
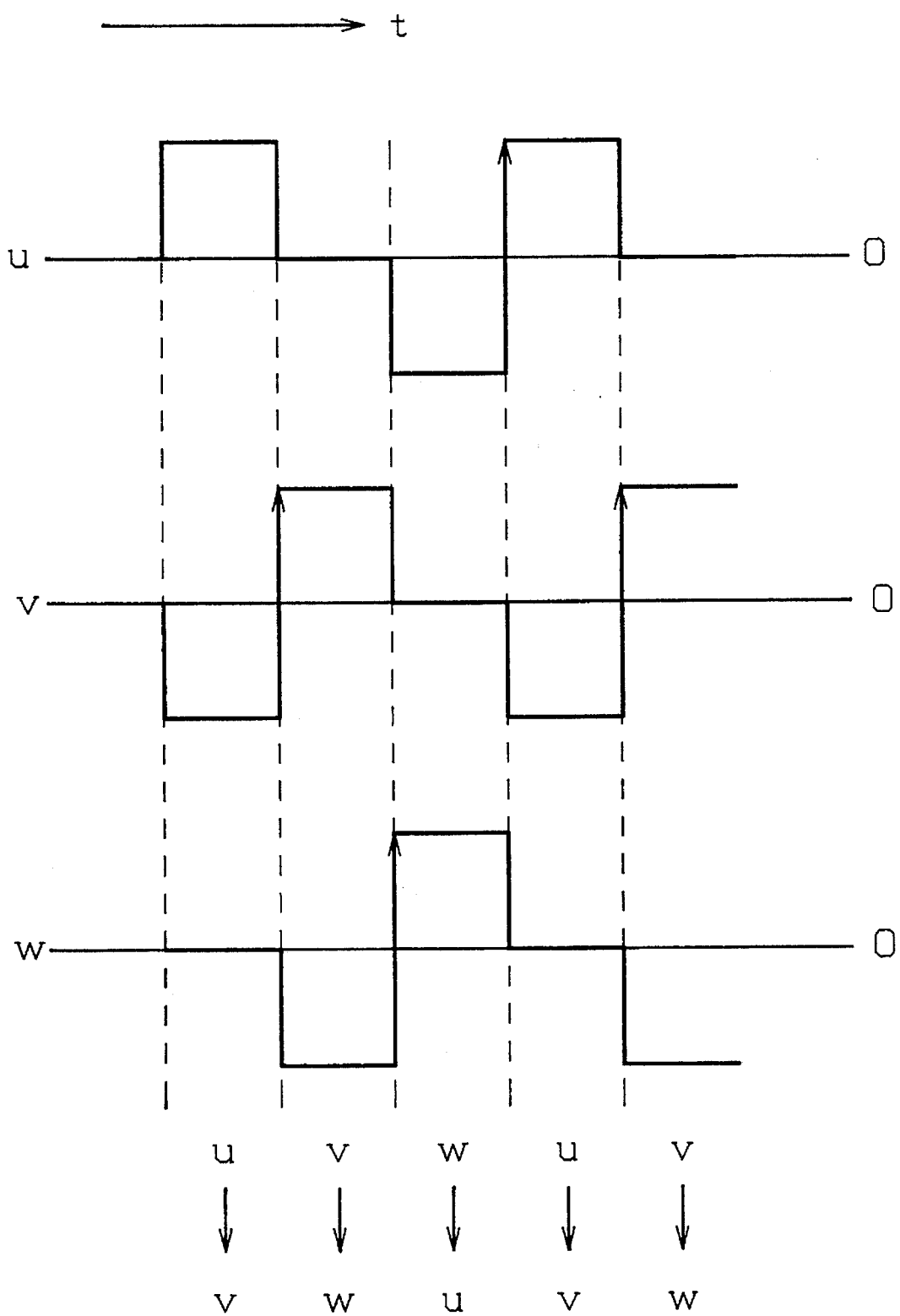
FIG. 6 is a time chart showing a first inner stepping pattern signal in a second specific example in a method of starting a sensorless motor in accordance with the invention.
Figure 7:
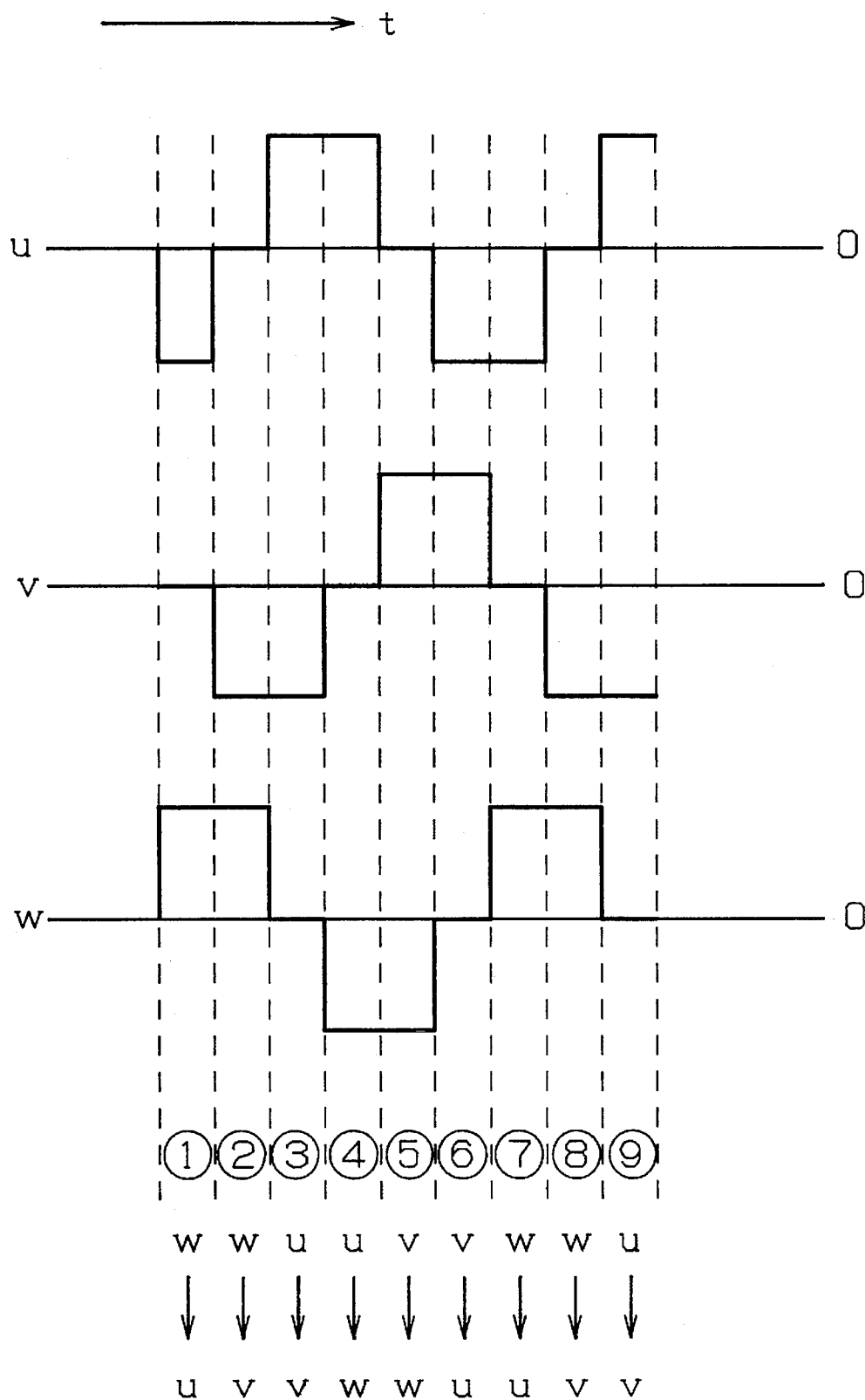
FIG. 7 is a time chart showing a second inner stepping pattern signal in a second specific example in the method of starting a sensorless motor in accordance with the invention.

FIGS. 6 and 7 show time charts of a method of starting a sensorless motor of the invention in the second specific example. FIG. 6 shows an inner stepping pattern signal carried out in the first stepping step, and FIG. 7 shows an inner stepping step pattern signal carried out in the second stepping step. In this specific example, the inner stepping pattern signal in the first stepping step shows that a step of supplying an exciting current to the stator coils u, v and w in a manner of u→v, v→w and w→u is repeated. Namely, a step which is skipped by 1 forwardly to the inner stepping pattern signal shown in FIG. 4 is performed.

Accordingly, in each step of the first stepping step, the time of flowing an exciting current is set at twice the time of step shown in the first specific example. At each of the stator coil u, v and w, each inner stepping pattern signal includes a reverse exciting operation in which without including a cessation time, an exciting current is switched off from positive to negative or from negative to positive. This reverse exciting operation is successively carried out in three-phase stator coils u, v and w, and it is possible to increase the rotating torque greatly in the first stepping step.

The inner stepping pattern signal of the second stepping step shown in FIG. 7 indicates that the motor is not at all started in the first stepping step. The inner stepping pattern signal in the second stepping step indicates that since the final inner stepping step of the first stepping step supplies an exciting current to the stator coil v→w, a step of supplying an exciting current to the stator coil w→u skipped by 1 forwardly thereof is started. In each step in the same way as in the first example, the exciting current repeatedly flows in the stator coils u, v and w in a manner of u→v, u→w, v→w, v→u, w→u, and w→v.

When such an inner stepping pattern signal is preset, a reverse exciting operation in which the exciting current is reversed from negative to positive without including a cessation time is performed at the stator coil w in the early period of the second stepping step. The same action and effect as in the first specific example are obtained. Furthermore, since the first stepping step includes a reverse exciting operation, the starting increases more certainly.

In this second specific example, when the motor oscillates in the first stepping step, the relative positional relation between the rotor magnet and the stator coils changes, and an exciting pattern signal changes in the first acceleration step, an inner stepping in the second stepping step is carried out in a condition wherein the step is skipped by 1 forwardly or rearwardly from the final exciting pattern signal of the first acceleration step.

Furthermore, in the second specific example, the inner stepping pattern signal of the second stepping step shown in FIG. 7 can use the same pattern as in the inner stepping pattern signal of the first stepping step shown in FIG. 6.

Third Specific Example

Figure 8:
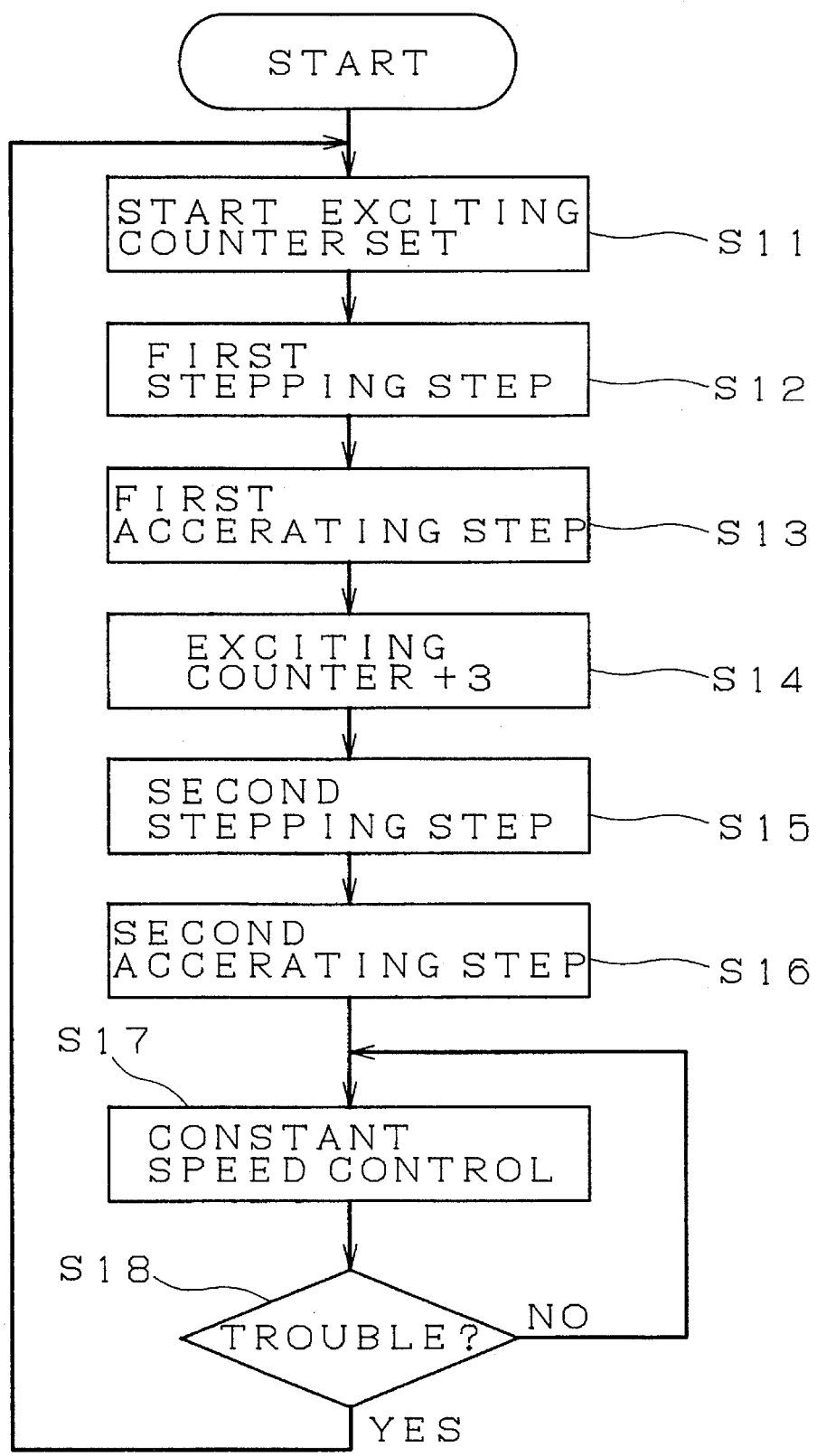
FIG. 8 is a flow chart showing a control in accordance with a third embodiment of the method of starting a sensorless motor in accordance with the invention.
Figure 9:
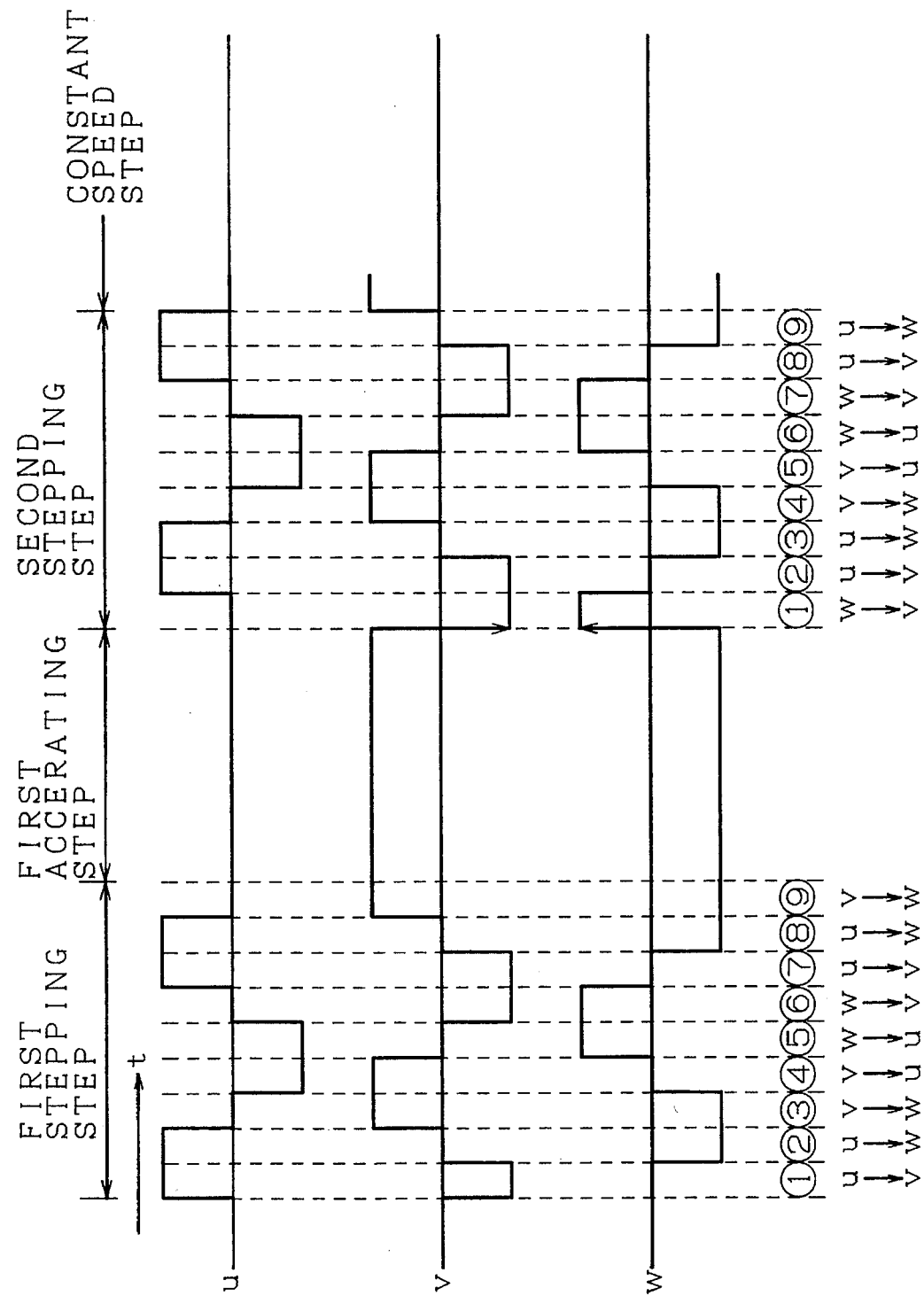
FIG. 9 is a time chart showing an inner stepping pattern signal of a stepping step practised in accordance with the flow chart of FIG. 8.

FIGS. 8 and 9 show the third specific example of the method of starting a sensorless motor in accordance with the present invention. In this example, the present invention, like the first and second specific examples, is applied to a three-phase sensorless DC motor. Its characteristics will be explained below. In the method of starting in this specific example, the control system of the motor is the same as in FIG. 1. The control flow at the time of starting performed with the control circuit 2 will be described.

FIG. 8 shows a control flow of the stepping step at the time of starting. In the control flow shown in FIG. 8, when the control circuit 2 receives a start signal and is actuated, the start exciting counter 6 is set in step s11, and the first stepping step is performed in step s12. In the first stepping step performed in step s12, the sequencer 5 is actuated based on the control signal of the control circuit 2, and its output signal is inputted into the driver circuit 3. Via the powder circuit 4, an exciting current is supplied for a predetermined period of time from the stator coil u to the stator coil w in the first inner stepping step (1). Thereafter, an exciting current is supplied from the stator coil u to the stator coil w in the second inner stepping step (2). Then, in accordance with the inner stepping pattern signal shown in FIG. 9, an exciting current is supplied successively to stator coils u, v and w. The inner stepping pattern signal of the first stepping step is the same as in the first specific example.

When the first stepping step of 9 inner stepping steps (1) to (9) is performed, the first acceleration step is carried out for a predetermined period of time in step s13. At this time, the relative position between the rotor magnet and the stator coils u, v and w is detected by the detection signal of the back electromotive force detection circuit 1 connected to each of the stator coils u, v and w. According to the detected position, the exciting pattern changes and rotation and control are carried out.

In a subsequent step s14, 3 is added to the counted value of the exciting counter 6 showing the final exciting pattern of the first acceleration step, and the second stepping step is performed in step s5. For example, when the motor is not at all started in the first stepping step carried out in step s12, the final step of its inner stepping is the 9th inner stepping step (9) as shown in FIG. 9. In this step, an exciting current is supplied to the stator coil v→w.

When 3 is added to the counted value of the exciting counter 6 in step s15, the first inner stepping step of the second stepping step is not as heretofore that an exciting current is supplied to the stator coil v→u. But a step of inner stepping in which an exciting current is supplied to the coil w→v skipped forwardly by 2 is carried out. Such an inner stepping pattern signal of the second stepping step is shown in FIG. 9.

When the second stepping step is carried out in this manner, a reverse exciting operation in which an exciting current is reversed from negative to positive without including a cessation time in the stator coil w is performed in the early period as shown in FIG. 9. What should be particularly noted in this case is that the reverse exciting operation carried out in the early period of the second stepping step is performed in two phases at u and w and moreover, the reverse exciting operations in the these phases become from negative to positive in the u phase and from positive to negative in the w phase reversing to each other. Accordingly, a reverse exciting operation is carried out in the two-phase coils, and therefore, the starting characteristics of the motor can be improved.

Such a reverse exciting operation is obtained not only when the motor is not at all started but also the starting is insufficient. Namely, the motor is started somewhat, but its torque is insufficient and the first stepping step results in oscillation. For example, when the step is just before the second stepping step, the step is inner stepping step (2). In the second stepping step, inner stepping from step (5) obtained by adding the calculated value 3 to the inner stepping step (2) is performed. As a result, the aforesaid reverse exciting driving operation is performed.

To obtain such a reverse exciting operation, not only 3 is added to the exciting counter 6 but also 3 is subtracted from the calculated value of the exciting counter 6 and the step is skipped by 2 rearwardly from the final inner stepping step of the first stepping step. As a result, the same reverse exciting operation as in the early period of the second stepping step is performed. When the second stepping step is carried out in step s15, a second acceleration step is set in step s16. Thereafter, the constant speed step is performed in step s17.

When the step is moved to the constant speed step and its condition shows no abnormality, that condition is maintained. On the other hand, if abnormality occurs in the constant speed step, and is detected in step s18, step s11 is returned and the treatment at the time of starting is performed.

According to the method of starting a DC motor as above, if the starting fails in the first stepping step, a reverse exciting operation is certainly carried out in the two-phase coils in the early period of the second stepping step. Accordingly, a large magnetic flux density variation width is developed, and the dead point of starting is dissolved. At the same time, a high torque is developed and the motor is exactly started.

In the third specific example, an inner stepping pattern signal in which a reverse exciting operation is not provided in the first stepping step is described as an example. But it is also possible to provide a reverse exciting operation as in the second specific example of the first stepping step.

Furthermore, the above specific example exemplifies a case wherein the first acceleration step of varying the exciting current based on the output signal of the back electromotive force detecting circuit 1 all after the first stepping step is provided. However, this first acceleration step may be omitted.

If the first acceleration step is omitted, a current holding step is provided in which the condition of the final inner stepping step of the first stepping step is maintained as it is, and in the second stepping step, a current is caused to flow in a condition in which the step is skipped forwardly or rearwardly by 1 or 2 from the final inner stepping step of the first stepping step.

The provision of a current holding step between the first stepping step and the second stepping step is described in U.S. Pat. No. 5,235,264. Reference to its explanation may be made.

Fourth Specific Example

FIGS. 10 to 14 show a fourth specific example of the method of starting a sensorless motor in accordance with this invention.

Figure 10:
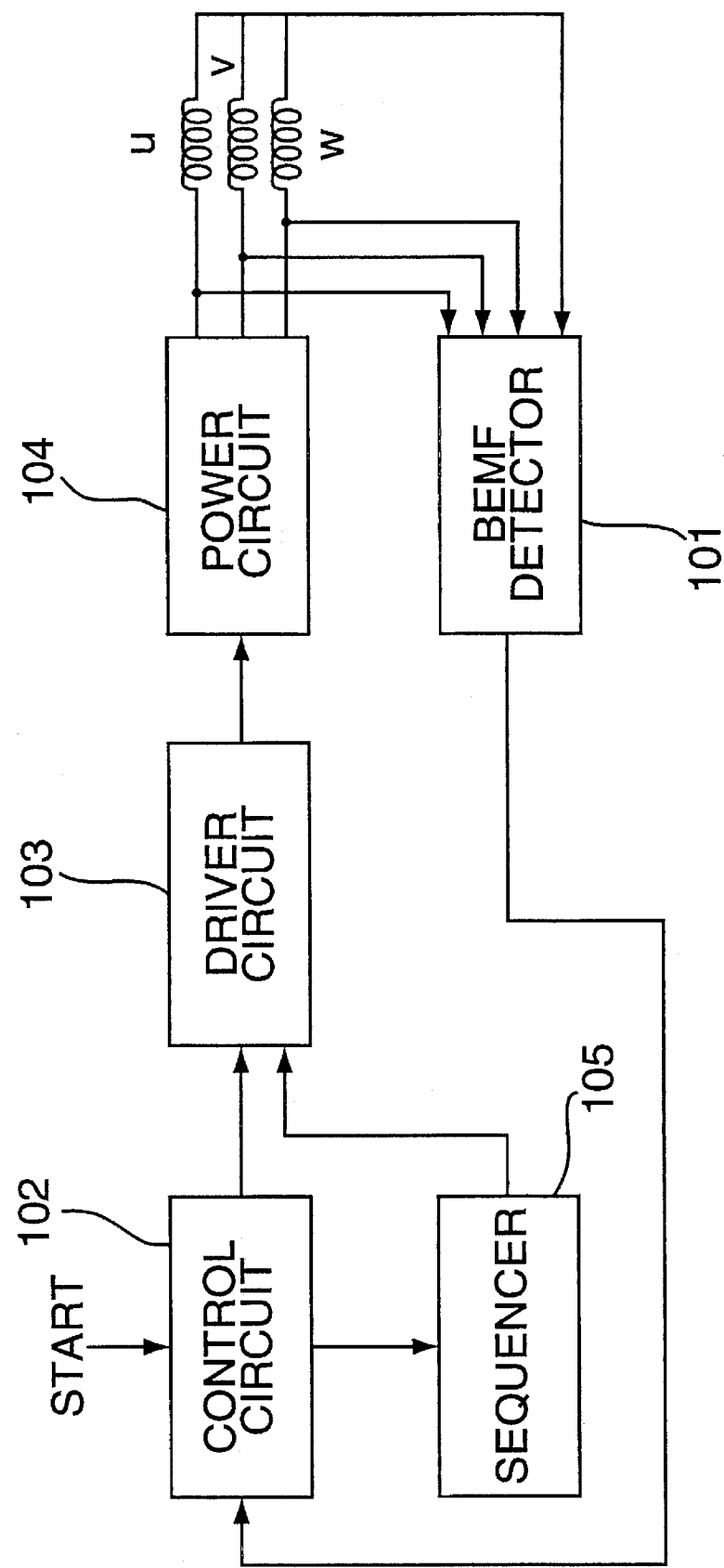
FIG. 10 is a block circuit diagram showing a control system of a DC motor to which a fourth specific example of the method of starting a sensorless motor in accordance with the invention is applied.
Figure 12:
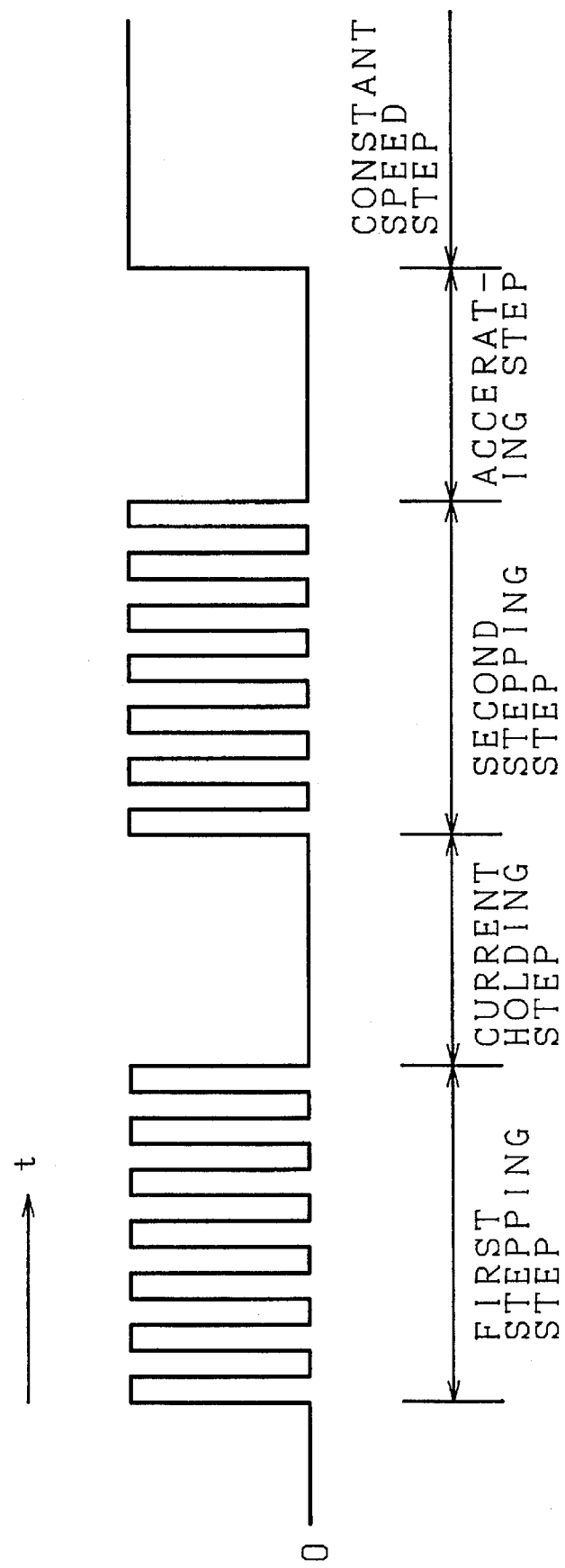
FIG. 12 is a time chart of a stepping step to be practised with the flow chart of FIG. 11.
Figure 13:
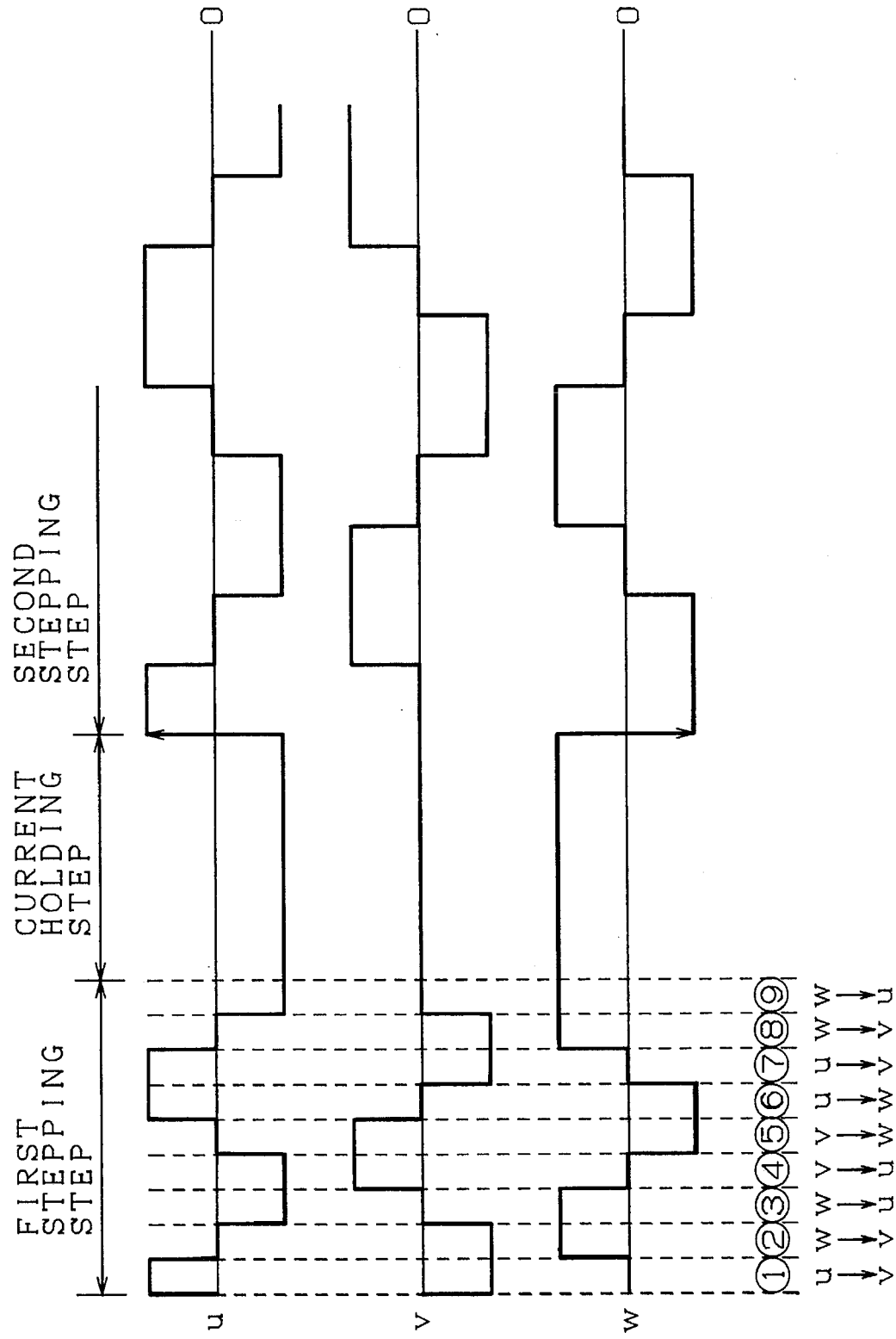
FIG. 13 is a time chart showing an inner stepping pattern signal in the stepping step practised in accordance with the flow chart of FIG. 11.

The control system of the illustrated motor, as shown in FIG. 10, has a back electromotive force detecting circuit 101 for detecting a back electomotive force induced in the stator coils u, v and w, a control circuit 102 into which a detected signal of the back electromotive force detecting circuit 101 is inputted, a driver circuit 103 connected to the output side of the control circuit 102, a power circuit 104 and a sequencer 105 for receiving a control signal of the control circuit 102 and outputting an inner stepping pattern signal to the driver circuit 103. These back electromotive force detecting circuit 101, control circuit 102, driver circuit 103, etc. act in the same way as in the first specific example. Now, with reference to FIGS. 11 to 13, the control flow in accordance with the above control system will be described. As shown in FIG. 12, in this specific example, the first and second stepping steps, and the acceleration step after the second stepping step are prescribed so that the stepping step is repeated twice. In each stepping step, an inner stepping pattern signal in which 9 inner stepping steps are carried out is produced by the sequencer 105. The inner stepping pattern signal of the first stepping step is as shown in FIG. 13. In a period synchronizing with the inertia of the motor, an exciting current is supplied to the stator coils u, v and w in a sequence of u→v, w→v, w→u, v→u, v→w and u→w. In this manner, nine inner stepping steps (1) to (9) from the first to the ninth are performed.

Figure 11:
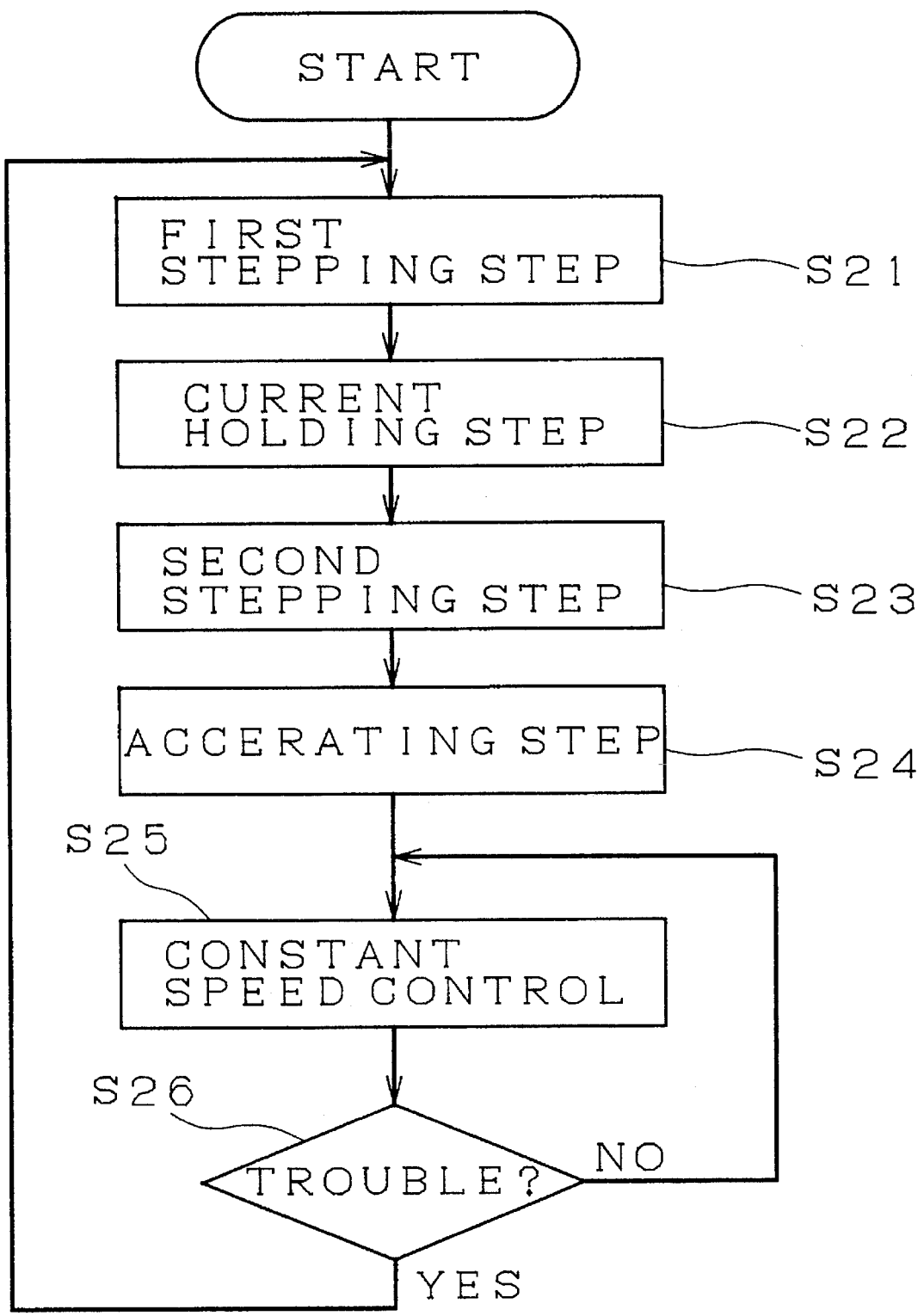
FIG. 11 is a flow chart showing a control of a motor with the control system of FIG. 10.

In the control flow shown in FIG. 11, when the control circuit 102 receives a start signal and is actuated, the first stepping step is performed in step s21. In the first stepping step performed in step s21, the sequencer 105 is actuated on the basis of the control signal of the control circuit 102, and its output signal is inputted to the driver circuit 103. Via the power circuit 104, an exciting current is supplied from the stator coil u to the stator coil v for a predetermined period of time in the first inner stepping step (1). In the next second inner stepping step (2), an exciting current is supplied from the stator coil w to the stator coil v. Thereafter, according to the inner stepping pattern signal shown in FIG. 13, the stator coils u, v and w are successively energized.

When the first stepping step including nine inner stepping steps (1) to (9) is performed, the current holding step is carried out for a predetermined period of time. Namely, an exciting current in the inner stepping step (9) is maintained during a period of the current holding step.

In the subsequent step s23, the second stepping step is carried out. At this time in the fourth specific example, the inner stepping pattern signal of the second stepping step is prescribed as stated below. First, with respect to the coil in the u phase, as shown in FIG. 13, it is prescribed that in the early period of the second stepping step, a reverse exciting operation in which the current flowing direction is reversed without including a cessation time is performed. With respect to the coil in the u-phase, since the stepping pattern signal is negative in the inner stepping step of the first stepping step, the inner stepping step of the early period of the second stepping step is prescribed as positive. In an example shown in FIG. 13, the same inner stepping pattern signal as in the first stepping step is prescribed in the second stepping step. With respect to the coil in the v-phase, an inner stepping pattern signal replacing the coil in the w-phase is prescribed in the second stepping step. That is to say, according to a prior method of starting, since the same inner stepping pattern signal as the first stepping step is prescribed with respect to the v-phase, the v-phase becomes negative in the early period of the second stepping step. However, when it is replaced by a w-phase, the v-phase becomes 0 in the early period of he second stepping step. Thereafter, an inner stepping pattern signal of the first stepping step of the w-phase is fed to the driver circuit 103.

Furthermore, with respect to the coil in the w-phase, an inner stepping pattern signal replacing the v-phase is fed to the driver circuit 103 in the second stepping step. When the second stepping step is carried out in this way, a reverse exciting operation in which the current flowing direction is reversed from negative to positive in the u-phase without including a cessation time is carried out, and a reverse exciting operation in which in the w-phase the current flowing direction is reversed from positive to negative is carried out. As a result, the current flowing directions are inverted to each other by these reverse exciting operations. Accordingly, if the motor is started in a condition of 0 torque, the ability of the magnetic material can be fully exhibited, and the motor can be exactly started within a very short period of rising.

Thereafter, when the above second stepping step is carried out in step s23, an acceleration step sets in s24, and thereafter, a constant speed step is carried out in step s25. When the step is transferred to the constant speed step and no trouble occurs, this condition is maintained. On the other hand, when a trouble occurs in the constant speed step and is detected in step s26, step s21 is returned and again the treatment at the time of starting is carried out.

According to the method of starting a DC motor mentioned above, if the starting in the first stepping step fails, reverse exciting operations are carried out in a plurality of phases in the early period of the second stepping step with the result that a great magnetic flux density variation width is developed, a high torque occurs and the motor is started exactly.

In the above specific example, the time of practising each step of the inner stepping pattern signal of the second stepping step is exemplified as approximately two times the inner stepping pattern signal of the first stepping step, but is not limited to it.

Figure 14:
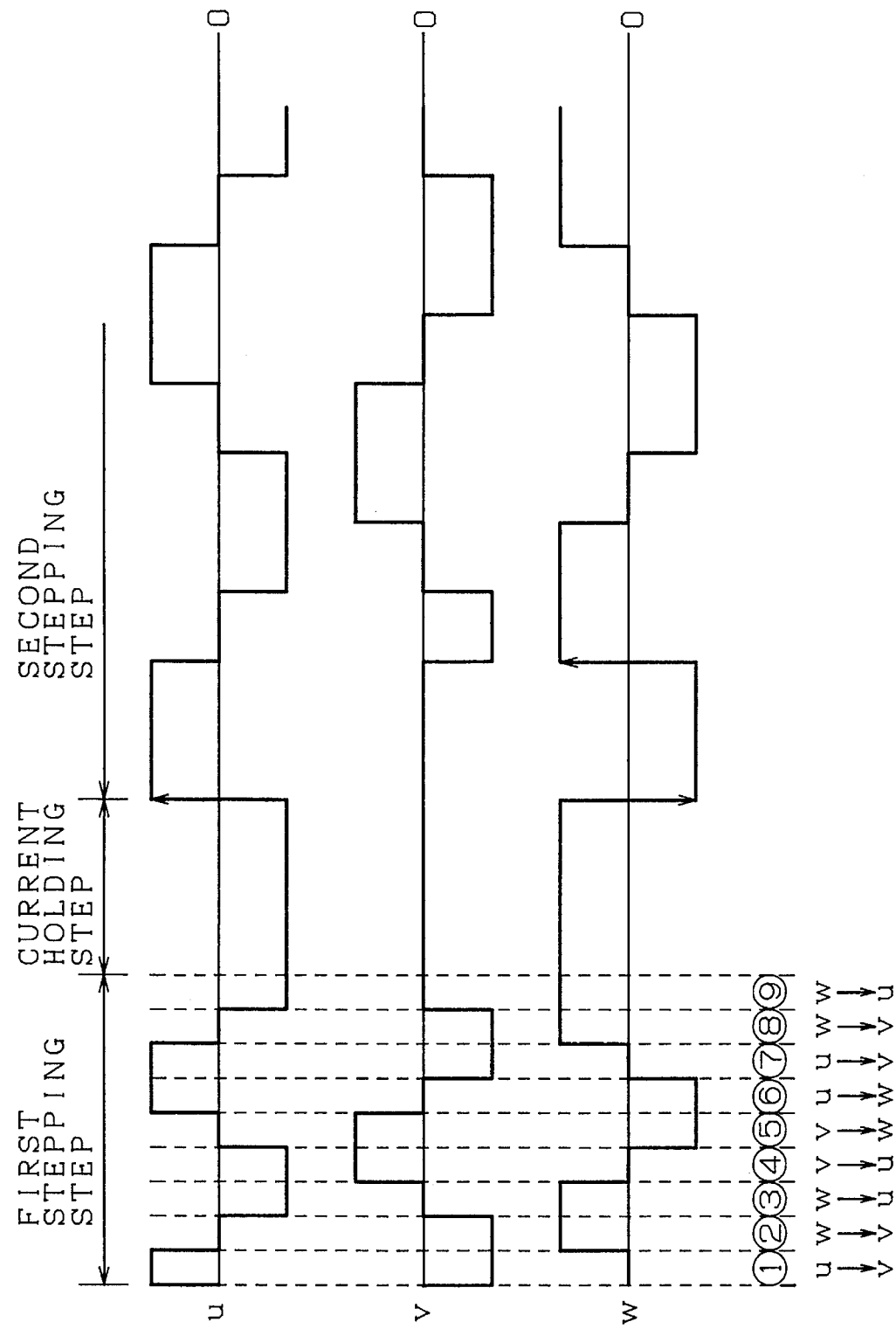
FIG. 14 is a time chart showing an inner stepping pattern signal in a stepping step in a modified example.

In the above specific example, a reverse exciting operation in two-phase coils is carried out in the early period of the second stepping step, and thereafter a usual second stepping step is carried out. However, a motor of a specific type, even if a reverse exciting operation is carried out at the starting of the second stepping step, cannot give a sufficient driving torque at a specific angular position and is likely to become poor in starting. In such a case, it is preferred to switch off the electric current as shown in FIG. 14. After a reverse exciting operation is carried out in two phases at the start of the second stepping step, for example, it is preferred to carry out a reverse exciting operation in one phase. More preferably, it should be carried out subsequently to two-phase reverse exciting operations. By so doing, even when a starting torque scarcely occurs in the reverse exciting operation at the time of starting the second stepping step, a sufficient torque is developed in a later reverse exciting operation and consequently, the rotor is rotated exactly.

Fifth Specific Example

In the fourth specific example, the phase is switched off in the second stepping step, and reverse exciting operations are carried out in two-phase coils. As shown in the fifth specific example, instead of the above operation, the frequency of the first inner stepping pattern signal in the first stepping step is demultiplied so that a reverse exciting operation may be carried out in two-phase coils. The control system of the fifth specific example may have the substantially same structure as in the control system of the fourth specific example, and its structure may be omitted.

Figure 15:
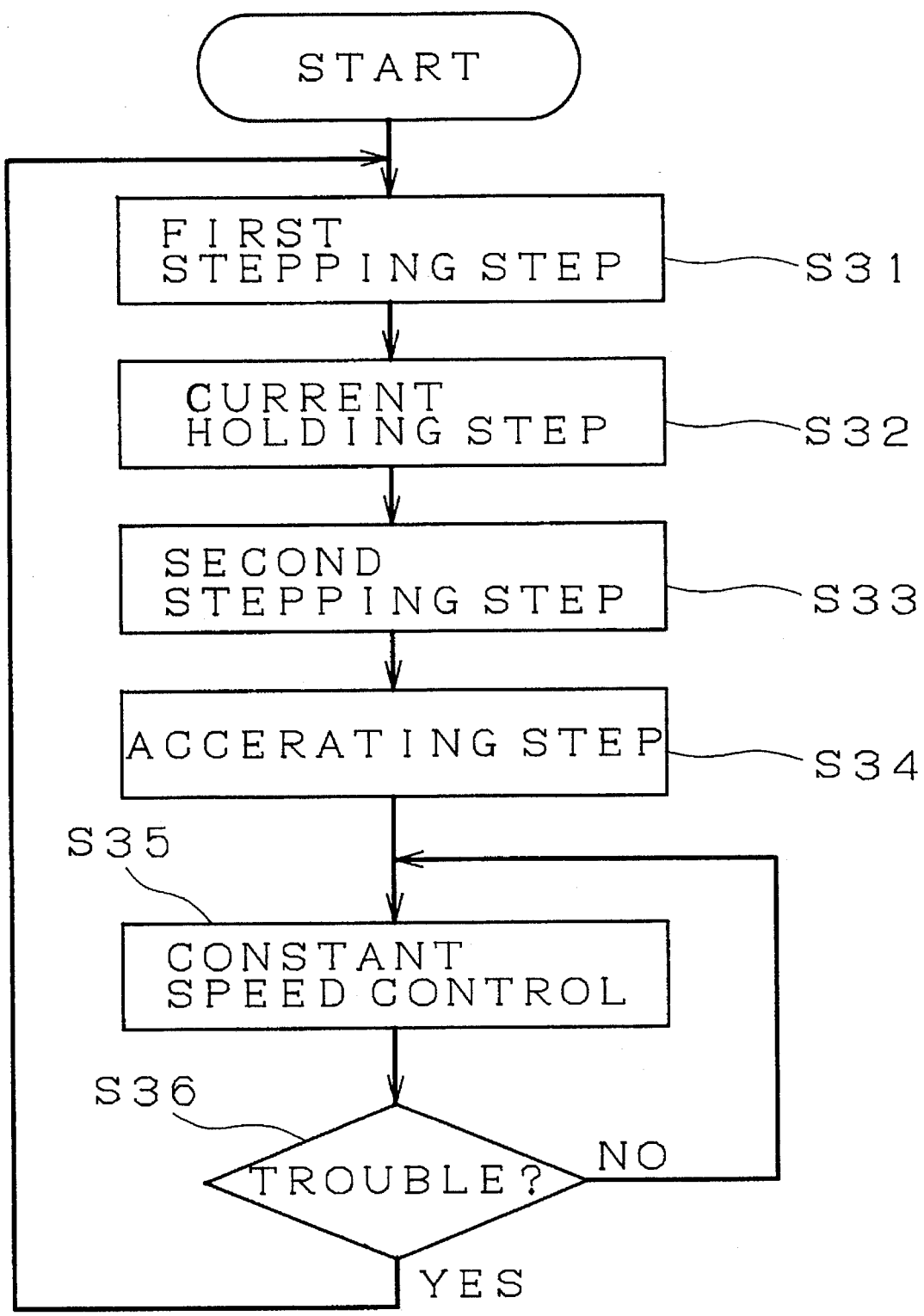
FIG. 15 is a flow chart showing a control of a control system of a DC motor to which a fifth specific example of the method of starting a sensorless motor in accordance with the invention.
Figure 16:
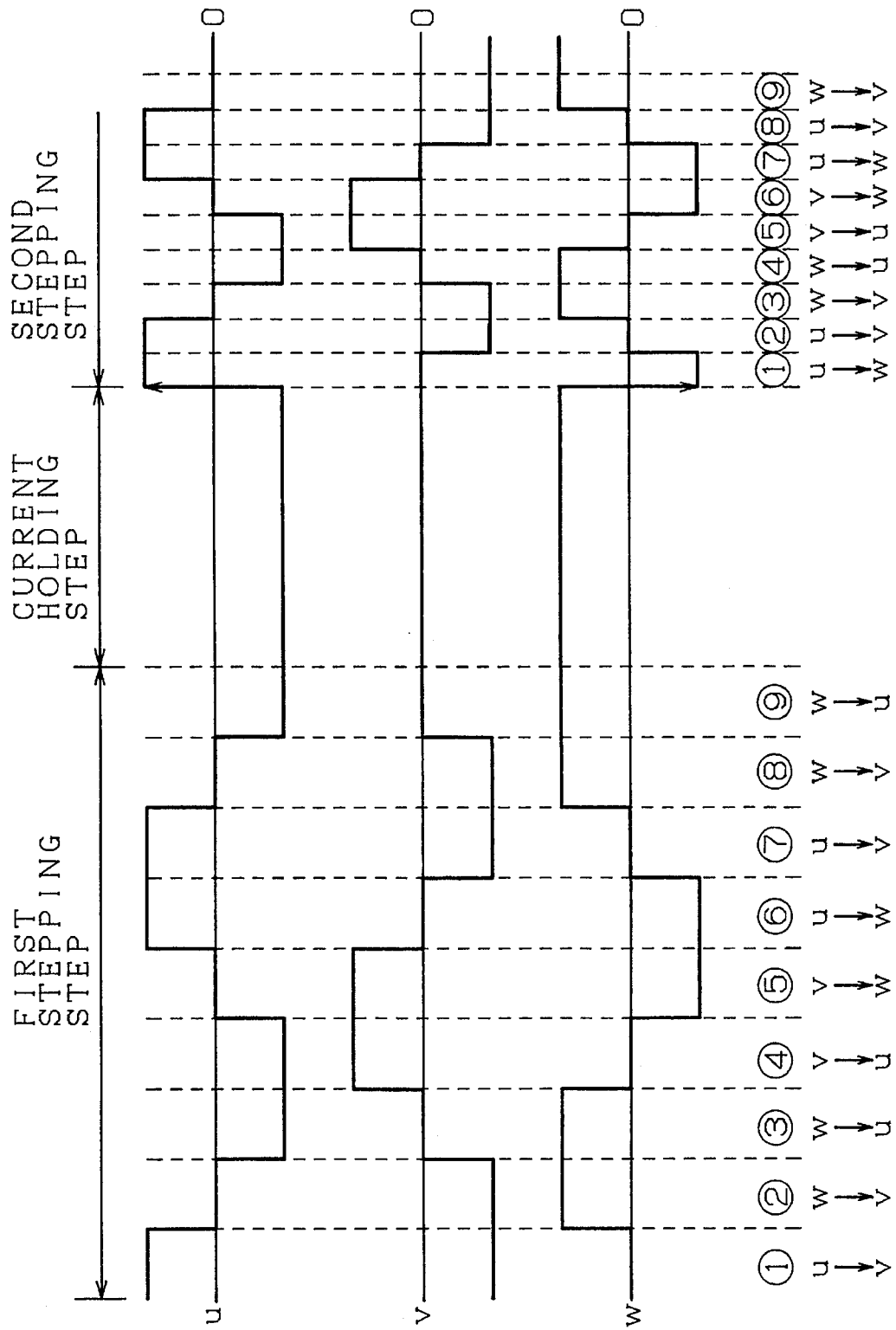
FIG. 16 is a time chart of a stepping step practised in accordance with the flow chart of FIG. 15.
Figure 17:
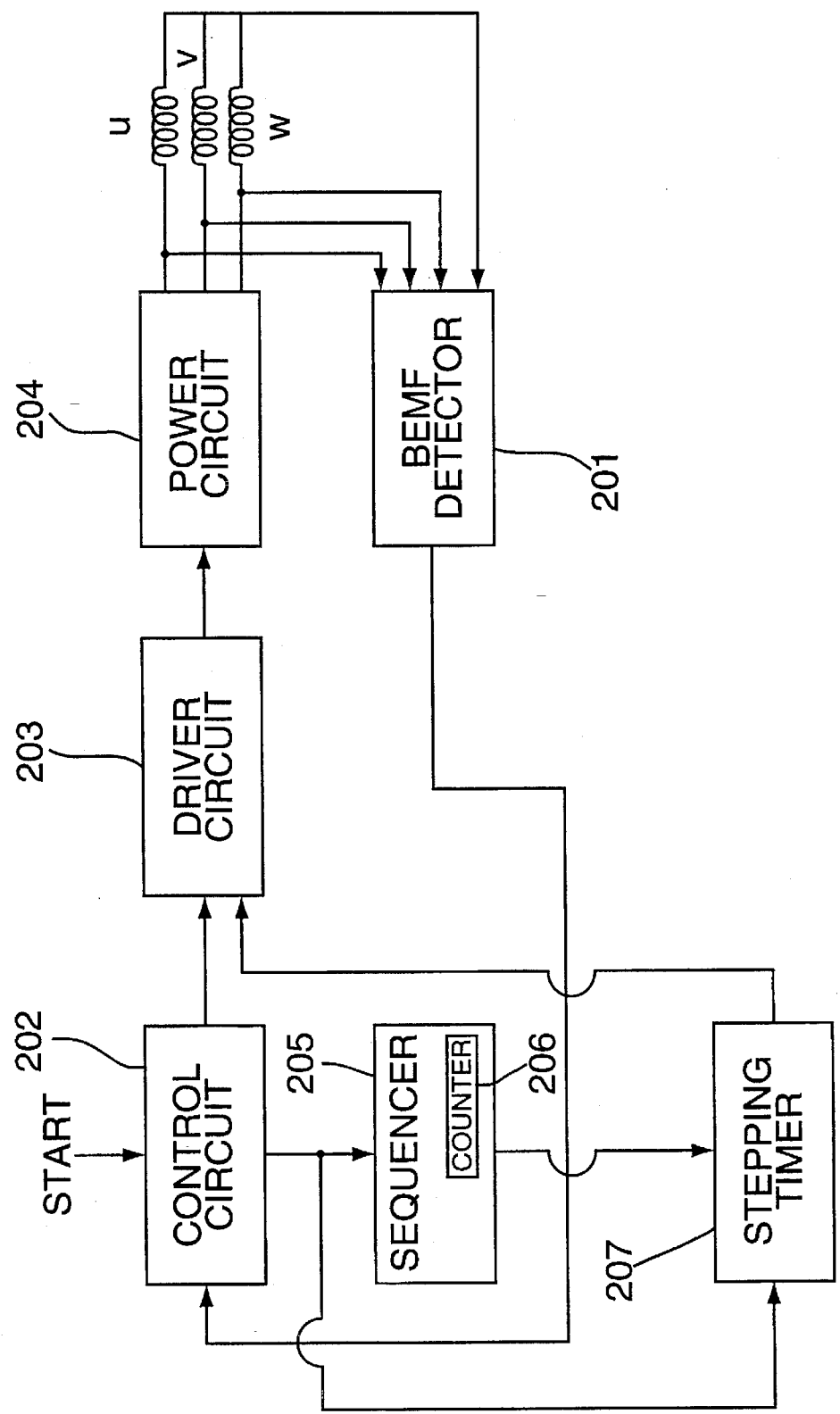
FIG. 17 is a block circuit diagram showing the control system of a DC motor to which a sixth specific example of the method of starting a sensorless motor in accordance with the invention is applied.

The controlling in the fifth specific example will be described in detail with reference to FIGS. 15 and 16. When the control circuit 102 receives a start signal and is actuated, a first stepping step is carried out in step s31. In the first stepping step carried out in step s31, the sequencer 105 is actuated on the basis of the control signal of he control circuit 102. Its output signal is inputted to the driver circuit 103 and is supplied to the power circuit 104. An exciting current is supplied from the stator coil u to the stator coil v, and then in the next second inner stepping step (2), it is fed from the stator coil to the stator coil v. Thereafter, the exciting current is fed successively to stator coils u, v and w in accordance with the inner stepping pattern signal shown in FIG. 16.

When the first stepping step including nine inner stepping steps is (1) to (9) carried out a current holding step is performed for a predetermined period of time in step s32. In this current holding step, the conditions of the exciting current in the inner stepping step (9) in the first stepping step are maintained during this period.

In the following steps 33, the second stepping step is performed. In the second stepping step, the frequency supplied of an exciting current in each of stator coils u, v and w is prescribed as twice that in the first stepping step. A means of obtaining an inner stepping pattern signal of such a frequency can be simply obtained, for example, by demultiplying the frequency of the signal of the first stepping step.

In this specific example, the frequency of the second stepping step is prescribed as twice the frequency of the first stepping step as an example, but the practice of the present invention is not limited to this example. For example, it may be prescribed as a multiplication of two or more integers. Furthermore, in this second stepping step, the second inner stepping pattern signal is prescribed in a condition in which the first inner stepping pattern signal of the first stepping step is shifted by 1 on the retarding side. In other words, the first inner stepping pattern signal of the first stepping step is started in a condition in which an electric current is caused to flow in the stator coil u→v in step (1) of the inner stepping pattern. On the other hand, the second inner stepping pattern signal of the second stepping step is started from a step of supplying an exciting current to the stator coil u→w in a condition in which shifting is performed by 1 on the retarding side. When an exciting current is supplied to the stator coils in this manner, a reverse exciting operation in which without including a cessation time an exciting current is reversed is carried out. Accordingly, in this specific example, the same effect as in the fourth specific example can be achieved.

When in step s33, the above second stepping step is carried out, an acceleration step is carried out in step s34, and thereafter, a constant speed step is performed in step s35. When the constant speed step sets in and there is no trouble in its condition, that state is maintained. On the other hand, when a trouble occurs, and is detected in step s36, step s31 is returned and again the starting treatment is carried out.

In the fifth specific example, as in the fourth specific example, after reverse exciting operations are carried out in two phases at the start of the second stepping step, a reverse exciting operation is preferably carried out in, for example, one phase. More preferably, reverse exciting operations are successively carried out in two phases.

Sixth Specific Example

Next, referring to FIGS. 17 to 22, the sixth specific example of a method of starting a sensorless motor in accordance with the present invention will be described. This DC motor has a stator generating a magnetic field in an excited condition and a rotor for obtaining a rotating force by the electromagnetic interaction with the magnetic field of the stator.

Three-phase stator coils u, v and w are wound on the stator. A back electromotive force detecting circuit 201 for detecting a back electromotive force induced in each stator coil u, v and w is connected to each stator coil u, v or w. The control system of this specific example includes a control circuit 202 into which a detecting signal for the back electomotive force detecting circuit 201 is inputted, a driver circuit 203 connected to the output side of the control circuit 202, a power circuit 204, a sequencer 205 and a stepping timer 207. The sequencer 205 includes an exciting counter 206.

The power circuit 204 receives an output signal from the driver circuit 203 actuating on the basis of an instruction from the control circuit 202, and supplies an exciting current to each stator coil u, v or w with a pattern prescribed in the exciting counter 206. The control circuit 202 controls the controlling of a steady operation at and after the starting of the motor on the basis of the signal from the back electromotive force detecting circuit 201.

The sequencer 205 receives a control signal from the control circuit 202 and sends out an exciting current of a predetermined stepping pattern signal. As shown in FIG. 18, a stepping pattern signal in which (1) u→v, (2) w→v, (3) w→u, (4) v→u, (5) v→w, and (6) u→w, six steps, are repeated with respect to stator coils u, v and w is prescribed.

The exciting counter 206 receives a signal of the control circuit 202, and based on this signal, changes the inner stepping pattern signal of the sequencer 205. For example, when it is set at 1, the stepping pattern signal sends out an exciting current in which steps (1) to (6) shown in FIG. 18 are repeated to the driver circuit 203. At the same time, when the exciting counter 206 is set at +2, steps (1), (3) and (5) are repeated in the stepping pattern signal shown in FIG. 18. When it is set at +4, steps (1), (5) and (3) are repeated.

Figure 19:
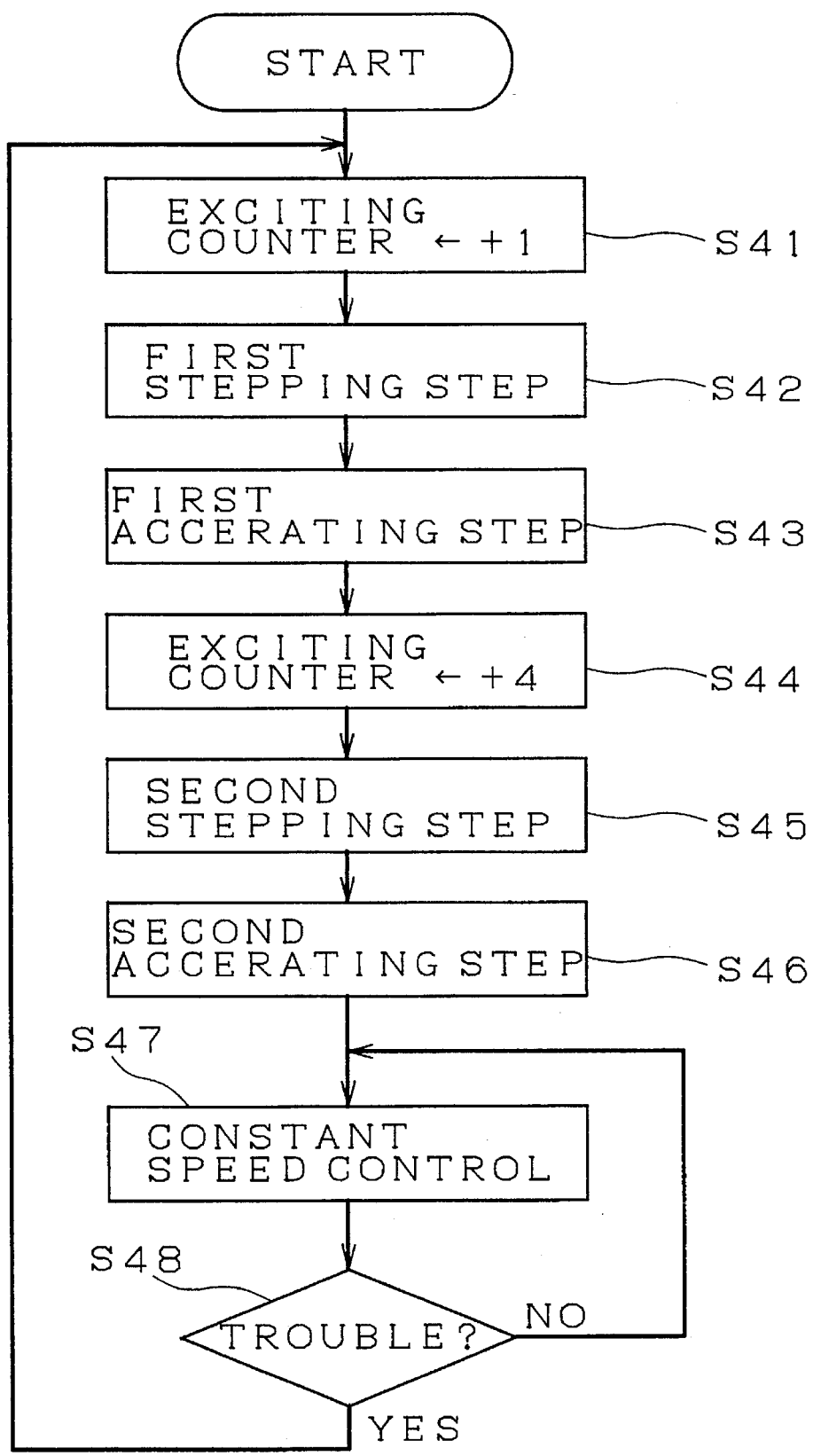
FIG. 19 is a flow chart showing the control of a motor with the control system of FIG. 17.
Figure 20:
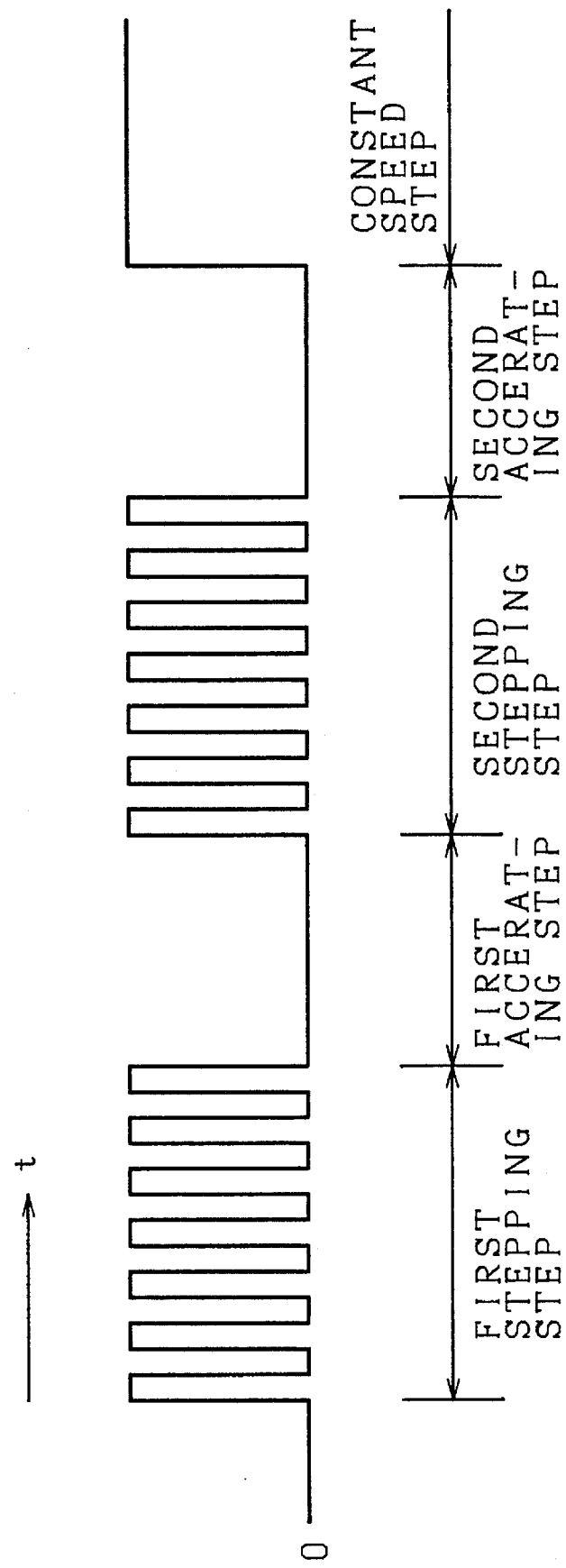
FIG. 20 is a time chart at the time of starting of the control to be practised by the flow chart of FIG. 19.
Figure 21:
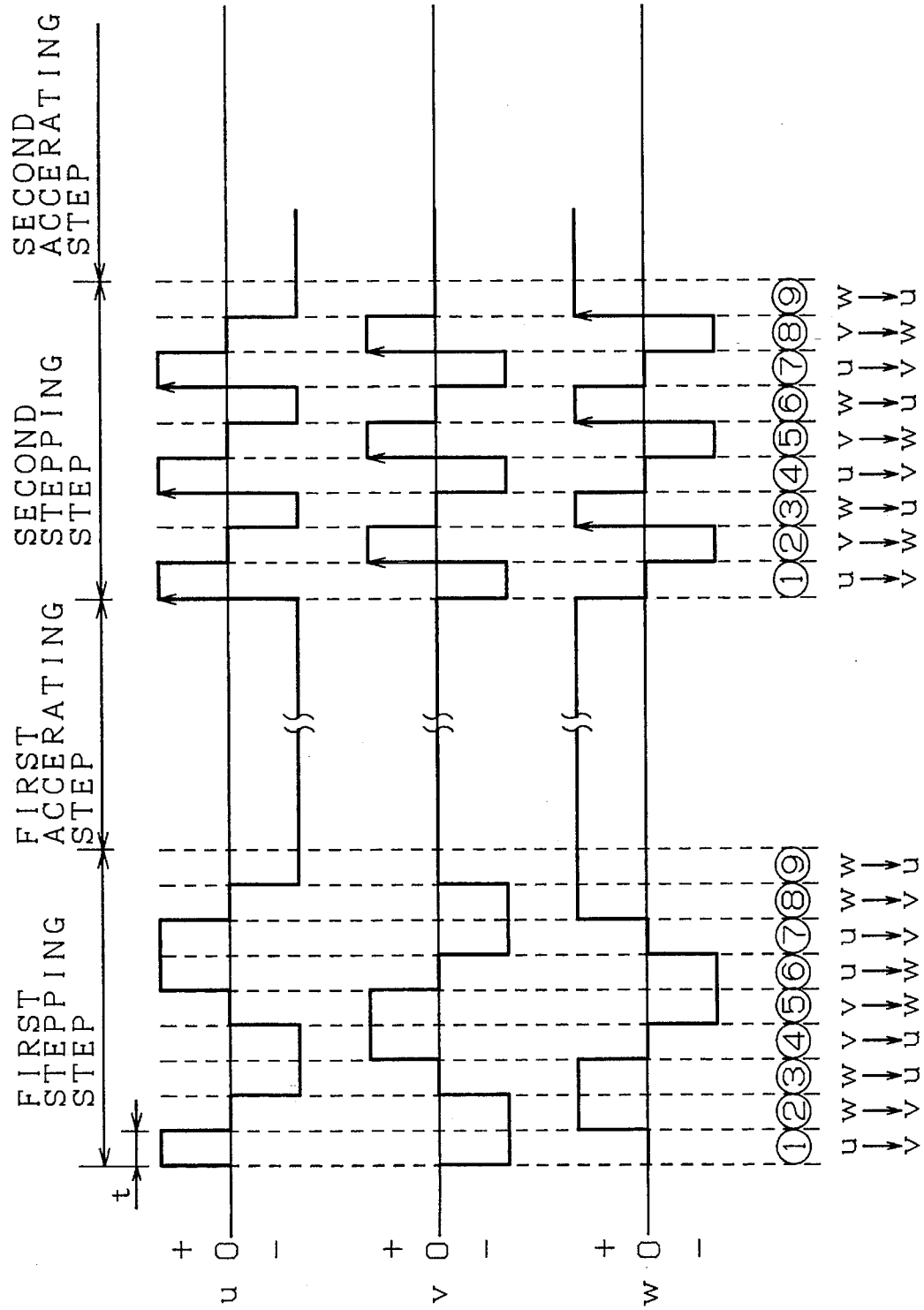
FIG. 21 is a time chart showing an inner stepping pattern signal in the stepping step practised in accordance with the flow chart of FIG. 19.

The stepping timer 207 prescribes the continuing time of an exciting current prescribed at the exciting counter 206 on the basis of the signal from the control circuit 202. FIG. 19 shows the control flow at the time of starting to be performed in the control circuit 202. FIGS. 20 and 21 show a time chart of the stepping step at the time of starting. In this specific example, the first and second stepping steps and the first and second acceleration steps are prescribed. In the following description, the prescribed time of the stepping timer 207 is described all as the timer.

In the control flow shown in FIG. 19, when the control circuit 202 receives a start signal and is actuated, the exciting counter 206 is set at 1 in step s41 and the first stepping step is carried out in step s42. Since in this first stepping step, the exciting counter 206 is set at 1, an exciting current in which steps (1) u→v, (2) w→v, (3) w→u, (4) . . . , (6) u→w shown in FIG. 18 are repeated nine times is repeated as shown in FIG. 21.

When the nine inner stepping steps (1) to (9) in the first stepping step are performed, the first acceleration step is carried out in step s43 for a predetermined period of time. At this time, by the detection signal of the back electromotive force detection circuit 201, the relative positions of the rotor magnet and the stator coils u, v and w are detected. According to the detected positions, the exciting pattern signal is changed and the rotation and control are performed.

In the subsequent step s34, the step is skipped by 1 rearwardly with respect to the final inner stepping step of the first acceleration step, the exciting counter 206 is set at +4, and the second stepping step is performed in step s45. For example, when the motor is not at all started in the first stepping step carried out in step s42, the final step of the inner stepping is, as shown in FIG. 21, the 9th inner stepping step (9). In this step, an exciting current is supplied to the stator coil in a manner of w→u.

In step s44, first the inner stepping step is skipped by 1 rearwardly to the final inner stepping step (9). It is well understood by referring to FIG. 18 that in the inner stepping step (1) of the second stepping step, an exciting current is supplied to the stator coil u→v. In step s44, the exciting counter 306 is set at +4. In the subsequent inner stepping steps, steps in which an exciting current is supplied to the stator coil v→w and the coil w→u are repeated. In FIG. 18, a pattern signal in which steps (1), (5) and (3) are repeated is executed.

When an exciting current is supplied in this way, a reverse exciting operation in which the current flowing direction is reversed from negative to positive without substantially including a cessation time first in the coil u (in FIG. 5, shown by a thick arrow) is performed in the second stepping step. At the same time, a reverse exciting operation in which from the early period the current flowing direction is reversed in a plurality of phases successively in the coils u, v and w without including a cessation time is carried out. Incidentally, such a reverse exciting operation can be obtained when the motor is not at all started but also when the starting is insufficient.

To obtain such a reverse exciting operation, when the second inner stepping step of the second stepping step is skipped by 1 from the final inner stepping step of the first stepping step, the same reverse exciting operation as above is carried out in the early period of the second stepping step. When in step s45, the second stepping step is performed, the second acceleration step is carried out in step s46, and thereafter, controlling at a fixed speed is carried out in step s47.

When a controlling at a fixed speed sets in, and no trouble occurs in the condition, that condition is maintained. On the other hand, when a trouble occurs in the controlling at a fixed speed and is detected in step s48, step s41 is returned and the starting treatment is again performed. According to the foregoing method of starting a DC motor, even if the starting fails in the first stepping step, reverse exciting operations are carried out successively in a plurality of phases in the early period of the second stepping step. Accordingly, a great magnetic flux density variation width is developed, and the motor is exactly started.

FIG. 22 shows a modified example of the method of starting mentioned above. This starting method differs from the above specific example in the conditions of the exciting counter 206 prescribed in step s44 in the control flow shown in FIG. 19. In step s44, the next step is skipped by 2 rearwardly with respect to the final inner stepping step of the first acceleration step, the exciting counter 206 is set at +2, and the second stepping step is performed in step s45.

For example, if the motor is not at all started in the first stepping step carried out in step s42, the final step of the inner stepping assumes a condition in which an exciting current is supplied to the stator coil w→u.

With respect to the final inner stepping step (9), in step s44, first the next stepping step is skipped by 1 rearwardly. As can be well understood by reference to FIG. 18, an exciting current is supplied to the stator coil u→w in the inner stepping step (1) of the second stepping step. Since the exciting counter 206 is set at +2 in step s44, the inner stepping step hereinafter, a step in which an exciting current is supplied to the coil v→w and the coil w→u is repeated. In FIG. 2, the inner stepping pattern signal in which the stepping step (6), (2) and (4) are repeated is outputted.

When an exciting current is supplied in this way, a reverse exciting operation (in FIG. 6, shown by a thick arrow) in which the current flowing direction without including a cessation period first in the coils u and w is reversed is carried out. Thereafter, a reverse exciting operation is carried out successively from the early period of stepping to the coils w, v and u in each phase.

By such a method of starting, the same function and effect as the above specific example. Especially, in this modified example, a reverse exciting operation in which the current flowing direction is reversed from positive to negative and from negative to positive of the coils in the two phases in the first of the second stepping step. Accordingly, the probability of starting the motor becomes higher. In the modified example shown in FIG. 22, when the second stepping step is carried out, the same effect can he obtained by skipping the final inner stepping step of the first stepping step by 2 forwardly.

The sixth specific example exemplifies a combination of skipping the final inner stepping step of the first stepping step by 2 forwardly or rearwardly in the second stepping step and prescribing the exciting counter 206 at +4, and a combination of skipping the final inner stepping step of the first stepping step by 1 forwardly or rearwardly and prescribing the exciting counter 206 at +2. But these combinations may be inverted.

in the above specific example, the first acceleration step is provided between the first stepping step and the second stepping step. But it is possible to omit the first acceleration step. Furthermore, in place of the first acceleration step, a current holding step in which the supply of the current is held without switching off the current may be provided. Furthermore, in the above specific example, a reverse exciting operation is successively carried out in a plurality of phases during the entire period of the second stepping step. But by carrying out the reverse exciting operation successively only in the early period of the second stepping step, the desired effect can be achieved.

What is claimed:

1. A method of starting a sensorless motor, wherein the motor comprises a stator provided with three-phase stator coils to which an exciting current is supplied, a rotor provided with a rotor magnet for obtaining a rotating torque by the electromagnetic interaction of the stator, a sequencer including an exciting counter which causes an inner stepping pattern signal to proceed, a driver means for supplying an exciting current to the stator coils based on the inner stepping pattern signal from the sequencer, and a control means for controlling the inner stepping pattern signal supplied to the driver means from the sequencer;

the method comprising a first and second stepping steps in which the inner stepping pattern is fed to the driver means at the time of starting the motor, the exciting counter causing the inner stepping pattern signal to proceed by 1, the control means controlling the sequencer so as to feed the inner stepping pattern signal skipped by 1 forwardly or rearwardly from an exciting pattern signal supplied to the driver means just before the inner stepping pattern signal in the second stepping step is fed to the driver means, and a third step comprising a reverse exciting operation in which the exciting current is switched off from one of positive to negative and negative to positive without including a cessation time in the coil of one phase out of three-phase coils in the early period of the second stepping step.

2. A method of starting a sensorless motor according to claim 1 wherein a first acceleration step is provided between the first stepping step and the second stepping step, and the control means controls the sequencer so as to feed the inner stepping pattern skipped by 1 forwardly or rearwardly from a final exciting pattern signal fed to the driver means in the first acceleration step.

3. A method of starting a sensorless motor according to claim 1 wherein a current holding step of holding a final exciting pattern signal of the inner stepping pattern signal fed to the driver means is provided between the first stepping step and the second stepping step, and the control means controls the sequencer so as to feed the second inner stepping pattern signal skipped by 1 forwardly or rearwardly from the final exciting pattern of the first inner stepping pattern signal into the driver means.

4. A method of starting a sensorless motor according to claim 1 wherein the stator has three-phase stator coils, and the reverse exciting operation in the first stepping step is carried out successively in each of the three-phase stator coils.

5. A method of starting a sensorless motor according to claim 1 wherein the sequencer causes the inner stepping pattern signal to proceed by 2 when the exciting pattern fed to the driver means is skipped by 1 forwardly, and causes the inner stepping pattern signal to retreat by 2 when the exciting pattern fed to the driver means is skipped by 1 rearwardly.

6. A method of starting a sensorless motor wherein the motor comprises a stator provided with three-phase stator coils to which an exciting current is supplied, a rotor provided with a rotor magnet for obtaining a rotating torque by the electromagnetic interaction of the stator, a sequencer including an exciting counter which causes an inner stepping pattern signal to proceed, for producing a predetermined inner stepping pattern signal, a driver means for supplying an exciting current to the stator coils based on the inner stepping pattern signal from the exciting counter, and a control means for controlling the inner stepping pattern signal fed to the driver means from the exciting counter;

the method comprising a first and second stepping steps in which the inner stepping pattern signal is fed to the driver means at the time of starting the motor, the exciting counter causing the inner stepping patter signal to proceed by 1, the control means controlling the sequencer so as to feed the second inner pattern signal skipped by 2 forwardly or rearwardly from are exciting pattern signal fed to the driver means just before the inner stepping pattern signal in the second stepping step is fed to the driver means, and a third step comprising reverse exciting operation in which the exciting current is switched off from one of positive to negative and negative to positive without including a cessation time in the coils of two phases out of three-phase stator coils in the early period of the second stepping step.

7. A method of starting a sensorless motor according to claim 6 wherein a first acceleration step is provided between the first stepping step and the second stepping step, and the control means controls the sequencer so as to feed the inner stepping pattern skipped by 2 forwardly or rearwardly from a final exciting pattern signal fed to the driver means in the first acceleration step.

8. A method of starting a sensorless motor according to claim 6 wherein a current holding step for holding a final exciting pattern signal of the inner stepping pattern signal fed to the driver means is provided between the first stepping step and the second stepping step, and the control means controls the sequencer so as to feed the second inner stepping pattern signal skipped by 2 forwardly or rearwardly from the final exciting pattern signal of the first inner stepping pattern into the driver means.

9. A method of starting a sensorless motor according to claim 6 wherein a reverse exciting operation in which an exciting current supplied to the stator coils is switched off from one of positive to negative or from negative to positive without including a cessation time is carried out in the first stepping step.

10. A method of starting a sensorless motor according to claim 9 wherein the stator has three-phase stator coils, and the reverse exciting operation in the first stepping step is carried out successively in each of the three-phase stator coils.

11. A method of staring a sensorless motor according to claim 6 wherein the exciting counter causes the inner stepping patter signal to proceed by 3 when the exciting pattern to be fed to the driver means is skipped by 2 forwardly, and causes the inner stepping pattern signal to retreat by 3 when the exciting pattern to be fed to the driver means is skipped by 2 rearwardly.

12. A method of starting a sensorless motor wherein the motor comprises a stator provided with three-phase stator coils to which an exciting current is supplied, a rotor provided with a rotor magnet for obtaining a rotating torque by the electromagnetic interaction of the stator; a sequencer for producing a predetermined inner stepping pattern signal, a driver means for supplying an exciting current to the stator coils based on the inner stepping pattern signal from the sequencer and control means for controlling the inner stepping pattern signal fed to the driver means from the sequencer;

the method comprising a first stepping step and second stepping step for starting the rotor at the time of starting the motor are carried out, in the first stepping step, a first inner stepping pattern signal being fed to the driver means, in the second stepping step, a second inner stepping pattern signal being fed to the driver means, the first inner stepping pattern signal and the second inner stepping pattern signal being composed of substantially the same stepping pattern signal, in the second stepping step, the second inner stepping pattern signal obtained by demultiplying the frequency of the first inner stepping pattern signal being fed from the sequencer to the driver means, the control means shifting the second inner stepping pattern signal to a retard side and a reverse exciting operation in which an exciting current is switched off from one of positive to negative and negative to positive without including a cessation time in the coils of two phases out of three-phase stator coils in the early period of the second stepping step.

13. A method of starting a sensorless motor according to claim 12 wherein a reverse exciting operation in which an exciting current supplied to the stator coils is switched off from one of positive to negative and negative to positive without including a cessation time is carried out in the second stepping step.

14. A method of starting a sensorless motor according to claim 13 wherein the reverse exciting operation in the second stepping step is successively carried out in each of the three-phase stator coils.

15. A method of starting a sensorless motor according to claim 14 wherein the sequencer includes an exciting counter for causing the inner stepping pattern signal to proceed, and the exciting counter causes the inner stepping pattern signal to proceed by 1 in the first stepping step and causes the inner stepping pattern signal to proceed by 2 in the second stepping step.

16. A method of starting a sensorless motor according to claim 14 wherein the sequencer includes an exciting counter for causing the inner stepping pattern signal to proceed, and the exciting counter causes the inner stepping pattern signal to proceed by 1 in the first stepping step, and causes the inner stepping pattern signal to proceed by 4 in the second stepping step.

* * * * *